(12) United States Patent
Beasley

(10) Patent No.: US 7,982,661 B2
(45) Date of Patent: Jul. 19, 2011

(54) COHERENT FREQUENCY MODULATED CONTINUOUS WAVE RADAR

(75) Inventor: Patrick D L Beasley, Malvern (GB)

(73) Assignee: QinetiQ Limited, London (GB)

( * ) Notice: Subject to any disclaimer, the term of this patent is extended or adjusted under 35 U.S.C. 154(b) by 561 days.

(21) Appl. No.: 11/887,205

(22) PCT Filed: Mar. 16, 2006

(86) PCT No.: PCT/GB2006/000937
§ 371 (c)(1),
(2), (4) Date: Sep. 26, 2007

(87) PCT Pub. No.: WO2006/103391
PCT Pub. Date: Oct. 5, 2006

(65) Prior Publication Data
US 2009/0251361 A1    Oct. 8, 2009

(30) Foreign Application Priority Data
Mar. 29, 2005    (GB) .................................. 0506209.6

(51) Int. Cl.
*G01S 13/32* (2006.01)
*G01S 13/34* (2006.01)
*G01S 13/00* (2006.01)

(52) U.S. Cl. ........ 342/128; 342/118; 342/159; 342/160; 342/175; 342/192; 342/194; 342/195; 342/196

(58) Field of Classification Search .................... 342/27, 342/28, 70–72, 82–115, 118, 127–133, 165, 342/173–175, 192–197, 200–205, 159–162, 342/188
See application file for complete search history.

(56) References Cited

U.S. PATENT DOCUMENTS
4,123,719 A * 10/1978 Hopwood et al. ............ 342/201
(Continued)

FOREIGN PATENT DOCUMENTS
CA    2 309 109    11/2001
(Continued)

OTHER PUBLICATIONS

Bui L Q et al.: "94 GHz FMCW radar for low visibility aircraft landing system," Microwave Symposium Digest, 1991., IEEE MTT-S International Boston, MA, USA Jun. 10-14, 1991, New York, pp. 1147-1150.

(Continued)

*Primary Examiner* — Bernarr E Gregory
(74) *Attorney, Agent, or Firm* — Nixon & Vanderhye P.C.

(57) ABSTRACT

A frequency modulated continuous wave (FMCW) radar is described. The radar includes a first discriminator for receiving a portion of the swept frequency signal generated by a frequency sweep generator and for producing a reference difference-frequency signal of frequency equal to the difference between the frequency of the swept frequency signal and the frequency of a time displaced swept frequency signal derived from the swept frequency signal. An analogue-to-digital converter is provided for sampling the target difference-frequency signal at a rate derived from the frequency of the reference difference-frequency signal. A processor (88) for determining frequency components of the digitized target difference-frequency signal is arranged to determine for at least one frequency component of the digitized target difference-frequency signal any phase difference between frequency sweeps of said swept frequency signal. The radar may be used for detecting foreign object debris (FOD) on runway surfaces and the like. A corresponding method of operating an FMCW radar is also described.

39 Claims, 10 Drawing Sheets

U.S. PATENT DOCUMENTS

| | | | |
|---|---|---|---|
| 4,201,986 A * | 5/1980 | Ducrocq | 342/100 |
| 4,388,622 A * | 6/1983 | Fletcher, Jr. | 342/112 |
| 4,539,565 A * | 9/1985 | Norsworthy | 342/128 |
| 4,593,287 A * | 6/1986 | Nitardy | 342/200 |
| 4,692,766 A * | 9/1987 | Rolfs et al. | 342/200 |
| 4,754,277 A * | 6/1988 | Voyce | 342/83 |
| 5,172,123 A * | 12/1992 | Johnson | 342/200 |
| 5,189,427 A * | 2/1993 | Stove et al. | 342/128 |
| 5,361,072 A * | 11/1994 | Barrick et al. | 342/133 |
| 5,379,001 A * | 1/1995 | Hedtke | 342/200 |
| 5,517,197 A * | 5/1996 | Algeo et al. | 342/70 |
| 5,642,081 A * | 6/1997 | Bosch et al. | 342/200 |
| 5,694,132 A * | 12/1997 | Johnson | 342/200 |
| 5,726,657 A * | 3/1998 | Pergande et al. | 342/202 |
| 5,910,785 A * | 6/1999 | Normant | 342/195 |
| 5,963,163 A | 10/1999 | Kemkemian | |
| 6,072,419 A * | 6/2000 | Normant | 342/194 |
| 6,317,074 B1 * | 11/2001 | Johnson | 342/82 |
| 6,664,920 B1 * | 12/2003 | Mott et al. | 342/129 |

FOREIGN PATENT DOCUMENTS

| | | |
|---|---|---|
| DE | 44 27 352 | 1/1996 |
| EP | 0 615 137 | 3/1994 |
| EP | 0 730 166 | 3/1995 |
| EP | 1 195 888 | 6/2001 |
| GB | 1 589 047 | 5/1978 |
| GB | 2 083 966 | 9/1981 |

OTHER PUBLICATIONS

Beasley P D L et al.: "Tarsier/spl R/, a millimeter wave radar for airport runway debris detection," Radar Conference, 2004, Eurad. First European Amsterdam, The Netherlands, Oct. 2004, pp. 261-264.

Nalezinski M et al.: "Novel 24 GHz FMCW front-end with 2.45 GHz SAW reference path for high-precision distance measurements," Microwave Symposium Digest, 1997., IEEE MTT-S International Denver, Co., USA Jun. 10-14, 1997, vol. 1, pp. 185-188.

PCT International Search Report mailed May 26, 2006.

European Search Report dated Jul. 18, 2005.

Written Opinion of the International Searching Authority dated May 26, 2006.

* cited by examiner

COHERENT FREQUENCY MODULATED CONTINUOUS WAVE RADAR

This application is the U.S. national phase of International Application No. PCT/GB2006/00937 filed 16 Mar. 2006 which designated the U.S. and claims priority to GB 0506209.6 filed 29 Mar. 2005, the entire contents of each of which are hereby incorporated by reference.

BACKGROUND OF THE INVENTION

1. Field of the Invention

The present invention relates to Frequency Modulated Continuous Wave (FMCW) radar and in particular to a coherent FMCW radar device and a method of FMCW radar operation.

2. Discussion of Prior Art

FMCW radar systems are well known and have been widely used in a variety of applications for many years. In such systems the range to a target is measured by systematically varying the frequency of a transmitted radio frequency (RF) signal. Typically, the radar is arranged so that the transmitted frequency varies linearly with time; for example a triangular or saw-tooth frequency sweep is implemented. This frequency sweep effectively places a "time stamp" on the transmitted signal at every instant and the frequency difference between the transmitted signal and the signal returned from a target (i.e. the reflected or received signal) can be used to provide a measure of target range.

It is also well known to those skilled in the art that the accuracy of range measurements made using an FMCW radar depend on the linearity of the frequency sweep. In a typical FMCW radar, a voltage controlled oscillator (VCO) is used to convert a voltage variation into a corresponding frequency variation. Although it is trivial to produce a high quality linear voltage variation (e.g. a triangular or saw-tooth waveform), conversion to the corresponding frequency variation by the VCO often results in the introduction of significant non-linearities that seriously degrade the range resolution of the FMCW radar. A number of different approaches have thus been adopted over the years with the aim of improving the frequency sweep linearity of FMCW radar systems.

For example, attempts have been made to produce VCOs that are inherently linear. In particular, YIG oscillators are now produced by Micro Lambda Wireless Inc, Freemont, Calif., USA in which a fine-tuning coil produces a frequency sweep linearity of, at best, 0.1%. It is also known to modify or pre-distort the voltage tuning signal applied to a standard VCO to compensate for any non-linearity in the VCO response characteristics. A number of analogue and digital pre-distortion techniques have been proposed which can improve VCO linearity to better than about 1%. This level of linearity has been found to be sufficient for certain low cost FMCW radar applications.

It has also been described previously in GB2083966 and GB1589047 how non-linear frequency sweep effects can be reduced by sampling a return signal in a non-linear manner. In particular, GB2083966 and GB1589047 describe how an artificial, fixed range, target may be used to generate a "beat" frequency from which a stream of sampling pulses can be derived. The interval between such sampling pulses would be constant for a perfectly linear frequency sweep, but will vary if the frequency sweep is non-linear. Use of a sample-and-hold circuit to sample the returned signal (i.e. the signal returned by a real target) thus compensates for any non-linearities in the frequency sweep of the transmitted signal.

To date, the most commonly used technique for improving the linearity of FMCW radars is closed loop feedback. Closed loop feedback techniques have been implemented in a variety of ways but they are all based upon creating an artificial target which generates a "beat" frequency when mixed with a reference signal. In a perfectly linearised FMCW radar a fixed range target would produce a constant "beat" frequency. Therefore, in a practical FMCW radar, if the "beat" frequency drifts from the desired constant frequency value an error signal can be generated to fine tune the VCO to maintain a constant "beat" frequency. This feedback technique can be implemented at the final RF frequency of the radar or at a lower, downconverted, frequency. Waveforms having a linearity better than 0.05% have been demonstrated with a bandwidth of around 600 MHz. An example of a closed loop feedback loop arrangement is described in the paper "Novel 24 GHz FMCW Front End with 2.45 GHz SAW Reference Path for High-Precision Distance Measurements" by M Nalezinski, M Vossiek, P Heide, (Siemens AG, Munich), IEEE MTT-S International Microwave Symposium, Prague, June 1997.

It should be noted that FMCW radar systems of the type described above operate incoherently. In other words, the radars only output information related to the frequency shift between the transmitted and returned signals; the radars are not able to measure the difference in phase between transmitted and returned signals. Although an incoherent radar system is suitable for many applications, the provision of a coherent system has many advantages. For example, coherent systems allow Doppler processing to determine information on the velocity of detected targets. Furthermore, coherent integration over N frequency sweeps improves the signal to noise ratio (SNR) by a factor of N. This should be contrasted to the SNR increase of $\sqrt{N}$ typically obtained using incoherent integration of N frequency sweeps.

Despite the clear benefits of coherent operation, the requirement to not only control the linearity of the frequency sweep but to also control the absolute frequency of each sweep has limited the development of coherent FMCW radar systems. At operating frequencies less than around 20 GHz, VCOs have been produced that have sufficient frequency stability to enable coherent operation. Attempts have also been made to implement coherent FMCW radar using direct digital synthesis (DDS). Although DDS allows the production of repeatable waveforms, it can only provide such waveforms at frequencies up to around 1 GHz. The DDS waveform must then be up-converted or multiplied to the final RF frequency or be included in a phase locked loop circuit. The up-conversion technique involves a local oscillator which will drift with frequency and does not lend itself to coherent operation. The phase locked loop technique can provide coherent operation at frequencies below 20 GHz but the phase noise of the transmitted signal is very poor resulting in poor radar sensitivity. To date, the benefits of coherent FMCW radar operation have thus been restricted to DDS radars operating at frequencies less than 20 GHz.

SUMMARY OF THE INVENTION

Accordingly, it is an object of the present invention to provide a coherent FMCW radar, and a method of coherent radar operation, that mitigates at least some of above described disadvantages. It is a further object of the invention to provide a coherent FMCW radar having improved range sensitivity and/or that can operate at frequencies greater than around 20 GHz.

According to a first aspect of the present invention, a frequency modulated continuous wave (FMCW) radar device comprises; a frequency sweep generator for producing a swept frequency signal; a transceiver for generating a signal to be transmitted by the radar from the swept frequency signal, said transceiver also being arranged to produce a target difference-frequency signal from the signal transmitted by the radar and the signal returned to the radar from a target(s); a first discriminator for receiving a portion of the swept frequency signal and for producing a reference difference-frequency signal of frequency equal to the difference between the frequency of the swept frequency signal and the frequency of a time displaced swept frequency signal derived from the swept frequency signal; an analogue-to-digital converter (ADC) for sampling the target difference-frequency signal to provide a digitised target difference-frequency signal, said ADC being arranged to sample the target difference-frequency signal at a rate derived from the frequency of the reference difference-frequency signal; and a processor for determining frequency components of the digitised target difference-frequency signal, characterised in that the processor is arranged to determine for at least one frequency component of the digitised target difference-frequency signal any phase difference between frequency sweeps of said swept frequency signal.

An FMCW radar is thus provided having a frequency sweep generator for producing a swept frequency signal. The swept frequency signal is formed from a succession of frequency sweeps and may comprise, for example, a saw-tooth or triangular frequency varying signal. The radar also comprises a transceiver that is arranged to receive a portion of the swept frequency signal and to produce therefrom an FMCW signal for transmission by the radar. The transceiver also generates a target difference-frequency signal by mixing a portion of the swept frequency signal that is transmitted by the radar (the transmit signal) with the signal returned to the radar from a remote target or targets (the return signal). The target difference-frequency signal is then sampled by an ADC to produce a digitised target difference-frequency signal that is fed to a processor which determines (e.g. using a complex fast Fourier transform) the frequency components of the digitised target difference-frequency signal. These various frequency components are associated with returns from targets at different ranges.

The rate at which the target difference-frequency signal is sampled by the ADC is varied dynamically in a manner that compensates for any non-linearity in the swept frequency signal produced by the frequency sweep generator. The sampling rate of the ADC is determined by providing a first discriminator that produces a reference difference-frequency signal from an extract of the swept frequency signal and a time delayed swept frequency signal. The frequency variation of the reference difference-frequency signal is related to the linearity of the frequency sweep and the ADC is thus clocked at a sampling rate that varies with the frequency of the reference difference-frequency signal. In this manner, the ADC outputs a digitised difference-frequency signal equivalent to that which would be obtained using a linear swept frequency signal. The use of non-linear sampling of this type to compensate for any non-linearity in the swept frequency signal produced by a frequency sweep generator has been outlined previously in GB2083966, is described in our co-pending British patent application 0421520.8 (Agent's Ref: IP/P7395/F1GB) and is also summarised in more detail below.

Although the use of non-linear sampling has been described previously in GB2083966, such a technique has only been used previously to provide incoherent FMCW radars. In accordance with the present invention, it has been realised that the technique can also be applied to provide coherent operation. In other words, it has been found that providing a processor that also measures the phase of at least one frequency component of the digitised target difference-frequency signal over successive sweeps of the swept frequency signal can, rather unexpectedly, allow coherent radar operation.

At this point, it should be noted that the differences between coherent and incoherent FMCW radars are well known to those skilled in the art. In a non-coherent radar system the frequency and amplitude of the various frequency components of the target difference-frequency signal are measured for each successive frequency sweep of the radar. The frequency and amplitude of each frequency component are related to the range and scattering strength of the associated target respectively. In a coherent radar system, the phase of each frequency component of the target difference-frequency signal is also measured for each frequency sweep. Measuring the phase of frequency components allows the coherent integration of multiple frequency components over successive sweeps. Coherent operation has a number of advantages; for example coherent integration over a number of frequency sweeps, N, improves the signal to noise ratio (SNR) by a factor of N whereas non-coherent integration only improves the SNR by a factor of around √N. In addition, coherent operation reduces the effect of backscattering from rain and also allows any Doppler shift of a return signal to be measured thereby allowing the speed of moving targets to be determined.

In a closed feedback loop radar of the type described by Nalezinski et al (ibid) the first point at which the ADC samples the target difference-frequency signal is synchronised with the start of each frequency sweep and all subsequent sampling point are separated by a fixed time interval. Consequently, any variation in the initial frequency of successive frequency sweeps will alter the absolute frequencies of the swept frequency signal at which the target difference-frequency signal is sampled. This variation in the start frequency of each frequency sweep thus introduces an unknown phase shift between the various frequency components of the target difference-frequency signal preventing coherent integration. It is thus generally accepted by those skilled in the art that coherent FMCW radar operation requires a frequency sweep generator capable of producing a swept frequency signal in which successive frequency sweeps have near identical absolute frequency characteristics. Although DDS based frequency sweep generators producing suitably stable swept frequency signals have been demonstrated at low frequencies, it has not been possible to provide sufficiently stable frequency sweep generators that can operate at frequencies greater than around 20 GHz.

As outlined above, the ADC of the present invention is clocked at intervals derived from the frequency of the reference difference-frequency signal produced by the first discriminator. It has, however, been found that this not only compensates for any non-linearities in the swept frequency signal but also results in the target difference-frequency signal being sampled at points that correspond to absolute frequencies of the reference difference-frequency signal. In other words, variations in the initial frequency of the swept frequency signal do not affect the points at which the target difference-frequency signal is sampled during each frequency sweep. The target difference-frequency signal will thus be sampled during each frequency sweep at times corresponding to the absolute frequency of the swept frequency signal; e.g. the ADC will be clocked whenever the swept frequency signal has an absolute frequency of F1, F2, F3 ... Fn. A radar of the present invention can thus offer coherent operation that is unaffected by small changes in the initial frequency of the swept frequency signal. Put another way, determining the phase of at least one frequency component of the digitised target difference-frequency signal of the radar of the present invention allows coherent radar operation. Furthermore, such coherent operation is not frequency dependent and can thus be used to implement high frequency (e.g. >20 GHz) operation. Those skilled in the art would not previously have considered such operation possible without also providing control over the initial frequency of the swept frequency signal produced by the frequency sweep generator.

It should be noted that significant variations in the start frequency of sweeps of the swept frequency signal may alter the first absolute frequency sample point of successive sweeps. Taking the example given above, a frequency sweep may have a start frequency between F1 and F2 in which case the ADC sampling point corresponding to F1 is omitted; i.e. a first frequency sweep may be sampled at F1, F2, F3 ... Fn whilst the subsequent sweep is sampled at F2, F3, F4 ... Fn. A number of techniques for signalling the presence of this effect and/or for correcting the associated phase jump are described in more detail below.

A frequency component of the digitised target difference-frequency signal from a fixed range (i.e. non-moving) target should have a phase that is substantially constant from frequency sweep to frequency sweep. If the phase of a frequency component related to such a fixed range target varies significantly between successive sweeps it indicates that the initial sampling point has altered (e.g. the first sampling point is F2 rather than F1). The processor is thus advantageously arranged so that said at least one frequency component of the digitised target difference-frequency signal corresponds to the return signal from at least one fixed range target. In other words, the processor determines, for successive frequency sweeps, the phase of at least one frequency component of the digitised target difference-frequency signal that corresponds to the return signal from at least one fixed range target. The fixed range target may be a target of opportunity or a target deliberately placed in the scene. Monitoring the phase of the frequency component of the digitised target difference-frequency signal from the fixed range target of opportunity over successive frequency sweeps thus provides an indication of any variation in the start frequency of the swept frequency signal that is sufficient to alter the first ADC sampling point.

The phase of the frequency components of two or more fixed range targets may be monitored by the processor. Preferably, the two or more targets are located at different ranges. The target(s) may be any real target (e.g. a building, fence post etc) located within the field of view of the radar or it may be added to the scene as required.

The at least one fixed range target of opportunity may be located at a range of less than 100% and more than 90% of the maximum instrumented range of the radar. In other words, the target of opportunity is preferably located just short of the full range of the radar. A target of opportunity that is located near the maximum range of the radar is preferred as it maximises the phase change that would be associated with a change in the first ADC sampling point of a frequency sweep.

Instead of, or in addition to, measuring the phase of the frequency component of a fixed range target of opportunity, the radar may advantageously comprise an artificial target signal generator. The artificial target signal generator preferably comprises a second discriminator for producing a fixed range artificial target difference-frequency signal from said swept frequency signal and a time displaced swept frequency signal derived from the swept frequency signal. Conveniently, the artificial target difference-frequency signal is added to the target difference-frequency signal produced by the transceiver prior to sampling by the ADC. In other words, an artificial fixed range target frequency-difference signal may be generated and added to the real target frequency-difference signals that are produced by mixing the return and transmitted radar signals.

Preferably, said artificial target signal generator produces an artificial target difference-frequency signal equivalent to that produced by a target located at a fixed range of less than 100% and/or more than 90% of the maximum range of the radar. As noted above in respect of targets of opportunity, a target near the maximum range of the radar is preferred as it maximises the phase change that is associated with a change in the first ADC sampling point.

Advantageously, the first discriminator comprises a first delay line to generate the time displaced swept frequency signal from the swept frequency signal. The first delay line is preferably an optical delay line. The optical delay line may conveniently comprise at least one light source, such as a laser diode, to convert a portion of the electrical swept frequency signal to a corresponding intensity modulated optical signal. The modulated optical signal may then be passed along an optical path or waveguide, such as a length of optical fibre, before being converted back to an electrical signal preferably using at least one optical detector. The electrical signal output by the optical detector (i.e. the time displaced swept frequency signal) is thus delayed (i.e. time displaced) relative to the swept frequency signal output by the frequency sweep generator. The first discriminator conveniently comprises a first mixer to mix the time displaced swept frequency signal with a portion of the undelayed swept frequency signal to generate the reference difference-frequency signal.

As described in more detail below, the delay imparted by the first delay line is conveniently selected to be equivalent to an integral multiple of the time-of-flight of a transmitted signal to a target at the maximum required radar range.

The second discriminator preferably comprises a second delay line to generate the time displaced swept frequency signal from the swept frequency signal. The second delay line may comprise an optical delay line similar to that described above in respect of the first delay line. However, the time displaced swept frequency signal generated by the second delay line discriminator is preferably displaced by a time equivalent to the delay that would be imparted to a signal returned from a target located near (e.g. within 90-100%) of the maximum range of the radar. The second discriminator conveniently comprises a second mixer to mix the time displaced swept frequency signal with a portion of the undelayed swept frequency signal to generate the reference difference-frequency signal.

The provision of optical delay lines is advantageous for a number of reasons. For example, long lengths (e.g. many tens or hundreds of meters or even several kilometers) of low loss optical fibre can be readily, and cheaply, provided. This enables long delays to be imparted to the time displaced swept frequency signal without any appreciable signal loss thereby allowing radar apparatus to be provided having a long maximum range of operation. Furthermore, an optical fibre based delay line provides very low levels of dispersion and has waveguide properties that are stable over a wide temperature range and do not vary significantly over time. This prevents unwanted, and unpredictable, variations in the duration of the delay being introduced when the operating environment of the radar is altered or as the equipment ages.

Optical fibre delay lines can readily provide a delay equivalent to the delay imparted by a free space path length of more than 100 m, more than 500 m, more than 1 km, more than 2 km, more than 5 km, more than 10 km, more than 20 km or more than 40 km. It should be noted that the physical length of the optical fibre waveguide will typically be shorter than the equivalent free space path length that the delay is intended to simulate. In other words, the effective refractive index of the optical fibre core is likely to be greater than the refractive index of free space. The physical length of the optical waveguide is thus selected to produce an equivalent time delay to the time taken for the radar energy to traverse a certain free space path length.

The use of an optical delay line also increases the flexibility of the delay line arrangement. For example, multi-tap optical fibres could be provided that, in combination with appropriate optical and/or electrical switches techniques would allow the imparted delay to be varied as required. In such a multi-tap arrangement, a single laser diode could be used to couple a modulated optical signal into the multi-tap optical fibre. In the case of electrical switching, an electro-optic detector may then be provided at each, or at least some, of the optical tap points. An electrical selector switch may then be used to direct the electrical output of only the desired electro-optic detector for mixing with the frequency swept signal to produce the reference difference-frequency signal. Alternatively, a laser diode may be provided at each, or at least some, of the optical tap points and a single detector provided which will receive radiation coupled into the optical fibre. Routing the frequency swept signal to the appropriate laser diode, or powering only the required laser diode, will then determine the delay that is imparted to the signal received by the detector.

In the case of optical switching, the output intensity of a laser diode could be modulated by the swept frequency signal. The modulated laser light would then be coupled into the multi-tap optical fibre and the output of each, or at least some, of the tap points fed to an optical selector switch. The optical selector switch will then route the optical signal that imparts the required delay to the electro-optic detector for conversion to an electrical signal and for subsequent mixing with the non-delayed swept frequency signal. Again, an alternative arrangement would comprise using an optical selector switch to route the laser output to any one of the multi-tap points and having the electro-optic detector optically coupled to a single tap point along the fibre. As noted above, a combination of electrical and optical switching would also be possible.

Instead of a multi-tap optical fibre, the optical delay line could simply comprise a plurality of optical fibres of different lengths. In this case, each optical fibre may have an electro-optic detector and laser diode associated therewith to allow electrical switching to be used to select the required delay. Alternatively, the optical output of the laser may be routed via a first optical switch to the selected fibre and the output of that fibre optically routed via a second optical switch to the electro-optic detector. A combination of electrical and optical switching would also be possible in a similar manner to that described above in respect of multi-tap optical fibres.

The provision of an optical delay means that can impart any one of a plurality of delays to the time displaced frequency swept signal offers a number of advantageous over a fixed delay line radar. For example, providing a first discriminator having a first delay line that can impart a variable delay allows the maximum range of the radar to be readily varied as required during use. In other word, the maximum range of the radar (which is inversely related to the radar's range resolution) can be increased or decreased as required during use.

The ability to adapt the range of the device as and when required provides a more flexible radar system that can be easily adapted for use in a variety of locations and/or for a number of different applications. It should also be noted that an alteration to the delay that is imparted by the first optical delay line may result in the need to alter other radar parameters to maintain optimum performance; for example, the bandwidth of the frequency sweep and/or the duration of the frequency sweep may need to be altered. A more detailed explanation of the relationship between the delay imparted to the frequency swept signal within the first discriminator, frequency sweep bandwidth and sweep duration is given below.

Advantageously, said first discriminator and said second discriminator share a common delay line. Preferably the common delay line is an optical delay line. It should be noted that whilst the first discriminator preferably imparts a delay equivalent to the maximum range of the radar, the second discriminator preferably imparts a delay slightly less than the delay equivalent to a return from the maximum range. The common delay line may thus be a multi-tap optical fibre; the optical signal being appropriately tapped from ports along the length of the optical fibre to provide the delays required by the first and second discriminators. Alternatively, the first discriminator may include an additional (relatively short) delay line to increase the delay provided by the common delay line.

Following the above, a skilled person would appreciate the numerous ways in which the optical delay lines of the first and/or second discriminators could be arranged to impart the required delay(s) to the time displaced swept frequency signal. The skilled person would also be aware of the various optical and electrical components, such as those used in telecommunication systems, that would be appropriate for implementing such an arrangement.

Advantageously, the processor is arranged to perform the steps of (a) measuring the phase of at least one frequency component of the digitised target difference-frequency signal corresponding to the return from at least one fixed range target over a plurality of successive frequency sweeps and (b) using the phase measurements of step (a) to maintain the phase alignment of other frequency components of the digitised target difference-frequency signal over said plurality of successive frequency sweeps. In other words, the processor is arranged to use any variations in phase associated with at least one frequency component of the digitised target difference-frequency signal that corresponds to the return from a fixed range target to correct the phase of the other frequency component of the digitised target difference-frequency signal. As outlined in more detail below, the phase compensation required is related to the range of each particular target.

As noted above, the ADC samples the target difference-frequency signal at fixed absolute frequency points during each frequency sweep. The phase of frequency components of the digitised target difference-frequency signal arising from fixed range targets will thus only change when the first absolute frequency point used to clock the ADC alters. For example, the phase of a fixed range target would alter if the ADC is clocked at frequencies F1, F2 . . . Fn during a first frequency sweep and F2, F3 . . . Fn during a subsequent frequency sweep. It can thus be seen that any change in the first absolute frequency value used to clock the ADC will be observed as a step change in the phase of each frequency component. For a target at maximum range, the step change in phase would be 180° and for targets closer than maximum range the phase change would decrease by an amount proportional to the target range. The processor is thus advantageously arranged such that step (a) comprises the step of monitoring the phase of said at least one frequency component for a jump (i.e. a step) in phase.

It should also be noted that the range of a target can be obtained from the frequency of the relevant frequency component of the target difference-frequency signal. At the same time, the phase of that frequency component of the target difference-frequency signal can be established. As the range of the fixed range target has been measured, it is possible to predict the phase jump that would occur if the first sample point of the ADC was to change between successive frequency (e.g. if the ADC was clocked at frequencies F, F2 . . . Fn during a first sweep and F2, F3 . . . Fn during a subsequent frequency sweep). The processor may thus be arranged to calculate threshold windows corresponding to such predicted step changes in phase and to detect if the phase of the monitored frequency component(s) exhibits such a step change during successive sweeps. If a step change is observed, the phase of the other frequency components can be corrected as necessary. In other words, monitoring the phase of the frequency component from a fixed range target allows the phase of other (e.g. range varying) targets to be aligned over successive frequency sweeps. This allows coherent integration even if a phase jump is observed.

Preferably, the processor is arranged to coherently integrate the phase aligned frequency components of the digitised target difference-frequency signal over a plurality of successive frequency sweeps. In other words, the phase alignment of frequency components over successive frequency sweeps makes coherent integration by the processor possible even if the first sampling point alters.

Conveniently, the device comprises a clock pulse generator, the clock pulse generator being arranged to convert the reference difference-frequency signal produced by the first discriminator into a series of timing pulses that are separated by intervals related to the frequency of the reference difference-frequency signal, wherein said timing pulses are used to clock the ADC. The clock pulse generator thus converts the sinusoidally varying reference difference-frequency signal into a series of timing pulses for clocking the ADC.

Preferably, the clock pulse generator comprises a zero crossing detector; a timing pulse is then generated whenever the voltage of the reference difference-frequency signal crosses zero. The temporal separation of the timing pulses is related to the frequency of the reference difference-frequency signal and consequently any variation in the frequency of the reference difference-frequency signal due to non-linearity of the swept frequency signal will alter the timing pulse separation. Furthermore, the occurrence of each timing pulse can be seen to be directly related to a feature of the reference difference-frequency signal (i.e. the zero crossing point) and is hence directly related to an absolute frequency of the swept frequency signal.

As noted above, the zero crossing detector could be arranged to produce a timing pulse on every zero crossing of the signal or only when zero is crossed from the positive or negative direction. The clock pulse generator may also comprise a frequency doubler for doubling the frequency of the signal that is applied to the zero crossing detector. The clock pulse generator may alternatively be arranged to detect other features of the reference difference-frequency waveform; for example, minima and/or maxima in the waveform amplitude may be detected or the point where the signal crosses a non-zero threshold may be detected. It should be noted that, rather than providing a clock pulse generator, an ADC could be used that can be clocked directly by the sine wave of the reference difference-frequency waveform.

Advantageously, the radar has a frequency up-conversion architecture. In other words, the swept frequency signal produced by the frequency sweep generator conveniently has a frequency range within a first frequency band and the signal transmitted by the radar has a frequency range within a second frequency band, the frequencies contained in the first frequency band being lower than the frequencies contained in the second frequency band.

Preferably, the transceiver comprises a frequency up-converter for increasing the frequency of the swept frequency signal to the frequency of the signal to be transmitted by the radar. Advantageously, said frequency up-converter comprises a stable local oscillator (STALO). The phase noise of the STALO is ideally of the same order as the phase noise of the VCO of the frequency sweep generator.

It is thus preferred to implement the invention using a so-called up-conversion architecture in which the frequency sweep generator operates at a lower frequency than the frequency that is finally transmitted by the radar. For example, the frequency sweep generator may operate in the UHF band (e.g. several hundred MHz to a few GHz) whilst the radar transmits a signal having a frequency of anything from 10 GHz to more than 100 GHz. The swept frequency signal generated in the low frequency band is up-converted to the radar transmission frequency band by an appropriate up-converter. It should also be noted that although the signal returned to the radar from a remote target is obviously within the same frequency band as the transmitted signal, when the transmit and receive signal are homodyne mixed they produce a target difference-frequency signal at baseband frequencies. This architecture thus allows the frequency sweep generator, first discriminator, second discriminator, ADC etc to operate in the lower frequency, UHF, band. This reduces both the cost and complexity of the radar and inherently lends itself to better phase noise performance. This leads to improved radar sensitivity compared with designs such as those described in GB2083966 in which the frequency sweep is generated directly at the final radar operating frequency.

A further advantage of an up-conversion architecture of this type is that the majority of the linearisation circuitry (i.e. the frequency sweep generator, first discriminator, ADC) is independent of the radar transmission frequency. The same linearisation circuitry can thus be used for different radar applications at different RF frequencies; although the transceiver components such as the STALO must obviously be selected so as to produce the required radar output frequency. The linearisation circuitry can thus be used, for example, in runway debris monitoring radars operating at 94.5 GHz, perimeter security radars operating at 35 GHz, level measurement radar transmitting at 24 GHz, bird detection radars working at 17 GHz, marine navigation radar operating at 9 GHz etc.

A device having an up-conversion architecture may conveniently comprise a STALO frequency drift monitor. The STALO frequency drift monitor being arranged to produce a drift monitor artificial target difference-frequency signal of frequency equal to the difference between the frequency of the up-converted RF signal transmitted by the radar and the frequency of a time displaced RF signal derived from the RF signal transmitted by the radar. An artificial target signal is thus generated using a portion of the up-converted RF signal to be transmitted by the radar and a time displaced version of that RF signal.

Advantageously, the base-band drift monitor artificial target difference-frequency signal is combined with said target difference-frequency signal prior to being sampled by the ADC. The processor will thus receive a frequency component from the artificial target difference-frequency signal.

The STALO frequency drift monitor operates at the final RF frequency of the radar and hence an RF delay line may be provided to produce the time displaced RF signal from the RF signal transmitted by the radar.

Preferably, the RF delay line comprises a length of waveguide having a substantially circular cross section. Circular cross-section waveguide (e.g. metal piping) can be readily procured and can be easily bent into a compact coil. It should be noted that circular cross-section waveguide is particularly suited to carrying circularly polarised RF radiation.

The RF front-end of the radar is conveniently implemented using rectangular (which herein shall be taken to include square) cross-section waveguide that carries linearly polarised RF radiation. The RF delay line thus conveniently comprises at least one length of waveguide having a substantially rectangular cross-section to match the other waveguide forming the RF front-end of the radar. Although rectangular cross-section waveguide is preferred to implement the RF portion of the radar, it is difficult to provide a sufficiently long length of such waveguide for a RF delay line.

The RF delay line may thus comprise at least one RF polarisation converter. More preferably, the RF delay line comprises a linear-to-circular polarisation converter and a circular-to-linear polarisation converter. This arrangement allows the linearly polarised RF radiation carried by rectangular cross-section waveguides of the RF front end to be converted to circularly polarised RF radiation. The circularly polarised RF radiation can then be transmitted down a long (e.g. 30 meter) length of circular cross-section waveguide before being converted back to linearly polarised RF radiation that is carried in rectangular cross-section waveguide to an RF mixer. In this manner, a compact and easy to fabricate RF delay line can be provided.

Advantageously, the transceiver comprises an In-phase Quadrature (IQ) mixer such that said target difference-frequency signal comprises In-phase (I) and Quadrature phase (Q) components. In-phase Quadrature (IQ) mixing is well known to those skilled in the art and enables not only the absolute frequency difference between two mixed signals to be determined but also provides the sign of the frequency difference. In other words, the use of in-phase (I) and quadrature phase (Q) components allows the processor to also determine whether the frequency of the return signal is greater than or less than the frequency of the transmitted signal. Frequency components can thus be assigned a sign of frequency; i.e. a negative frequency could indicate the return signal frequency is, say, less than the transmit frequency whilst a positive frequency would then indicate the return signal frequency is greater than the transmitted frequency.

The ADC preferably comprises at least first and second ADC elements, the first ADC element being arranged to sample the in-phase (I) component of the target difference-frequency signal and the second ADC element being arranged to sample the quadrature phase (Q) component of the target difference-frequency signal. The ADC elements are preferably driven by a common clocking signal and arranged to separately sample the I and Q channels. Further ADC elements may be provided if required; for example to allow any artificially created signals to be sampled separately to the real radar returns.

The processor is advantageously arranged to determine the frequency components of the digitised target difference-frequency signal using a complex Fast Fourier Transform (FFT). This allows, when I and Q channels are present, the sign of the imparted frequency shift to be determined. In other words, it can be determined whether the return signal has a higher or lower frequency than the transmitted signal using such a complex FFT processing scheme.

Preferably, the artificial target difference-frequency signal produced by the artificial target generator comprises in-phase (I) and quadrature phase (Q) components. In such a case, the artificial target difference-frequency signal may conveniently be arranged to have a different sign of frequency to frequency components of the target difference-frequency signal that correspond to real targets. In other words, the artificial target may have, say, a negative frequency whereas real targets have a positive frequency. This ensures that the artificial target difference-frequency signal does not interfere with returns from real targets and vice versa.

Conveniently, the drift monitor artificial target difference-frequency signal comprises in-phase (I) and quadrature phase (Q) components. In such a case, the drift monitor artificial target difference-frequency signal is conveniently arranged to have a different sign of frequency to frequency components of the target difference-frequency signal that correspond to real targets. Again, this allows separation of the artificial and real frequency components when analysed by the processor.

The frequency sweep generator may advantageously be arranged to output a saw-tooth swept frequency signal. In such a case, the gradient of the frequency slope is always positive (or always negative) and hence the frequency difference of a real signal (which is a time shifted version of the transmitted signal) will always be the same sign (i.e. the range is never negative). In such a case, the artificial target can be readily arranged to always have the opposite sign to the real targets thereby ensuring the artificial targets do not interfere with real targets or vice versa.

Conveniently, the frequency sweep generator comprises a voltage controlled oscillator. Because the VCO does not require an accurate tuning characteristic, it can be very low cost such as, for example, the type used in the mobile telecommunications industry. Preferably, the frequency sweep generator comprises a voltage signal generator for outputting a digitally pre-distorted tuning signal to the voltage controlled oscillator. In this manner, the linearity of the VCO can be improved. Although the radar of the present invention will compensate for the non-linearity of any monotonic swept frequency signal, it is preferable that the voltage controlled oscillator outputs a swept frequency signal having a linearity of better than 10%, especially in cases when the radar also includes an anti-alias filter. The inclusion of such an anti-alias filter improves performance of the radar by cutting off any frequencies higher than the Nyquist frequency, but may lead to loss of signal detection sensitivity near maximum range if the linearity of the swept frequency signal is greater than around 10%.

Herein, the term "linearity" shall mean the percentage deviation of the frequency gradient away from linear. This may be expressed as a "±x %" value to refer to the minimum and maximum variations, or simply as an average deviation of "x %". A small percentage linearity value thus means a highly linear signal (zero being perfectly linear), whereas a high percentage linearity value means a signal of poor linearity. Describing linearity in this manner is commonly used by those skilled in the art.

Advantageously, the processor is arranged to perform Doppler processing. This enables target velocity to be established. Performing an FFT across the data acquired for a plurality of successive sweeps may also be performed, if required, to remove any range/velocity ambiguity.

Conveniently, the processor is arranged to provide moving target indication (MTI). MTI techniques assign weightings to the amplitude of the time domain data for a number of successive sweeps. The weightings are selected to provide an indication of any phase changes between sweeps that could be indicative of target movement. Although target movement can be identified, it is not possible to measure target velocity etc using MTI techniques. MTI processing thus provides less information than full Doppler processing, but can typically be implemented at lower cost and may therefore be desirable for certain applications.

Preferably, the radar is arranged to transmit a signal within a frequency band of 9 GHz to 150 GHz, or more preferably within a frequency band of 70-80 GHz or 90-100 GHz. The radar may conveniently be arranged to transmit a signal having a frequency around 77 GHz or 94.5 GHz; these frequencies are advantageous as they fall within windows in atmospheric absorption.

Any commercial radar system would preferably be arranged to operate at frequencies that also lie within the international frequency allocations as governed by the International Telecommunications Union (ITU). In the United Kingdom, frequency allocations are governed by the communications regulatory body, OFCOM. It would thus be convenient to provide a radar that transmits a signal having a frequency within one of the ranges 76-81 GHz, 92-95 GHz or 95-100 GHz.

At frequencies above approximately 40 GHz, it is typically necessary to guide signals using microwave waveguides. The radar is thus conveniently arranged to transmit a signal having a frequency greater than 40 GHz.

Furthermore, the radar is preferably arranged to transmit a signal having a frequency greater than 20 GHz. Prior to the present invention, coherent FMCW radars operating above such a frequency were thought impractical by those skilled in the art.

The radar may further comprise an antenna and the antenna may comprise separate transmit and receive antenna elements. In other words, a bi-static antenna array could be provided. A mono-static antenna could alternatively be used.

A radar of the present invention may be used in a number of applications. For example, the radar may be used to detect an object on a surface. The object may comprise foreign object debris (FOD) and the surface may comprise an airport runway. The radar may also be used for perimeter security applications. For example, it may be used to detect and/or track objects (e.g. vehicles or persons) entering or moving across a defined area.

According to a second aspect of the invention, a coherent frequency modulated continuous wave (FMCW) radar is provided that has an operating frequency greater than 20 GHz.

According to a third aspect of the invention, a method of radar operation comprises the steps of; (i) generating a swept frequency signal; (ii) producing a reference difference-frequency signal of frequency equal to the difference between the frequency of the swept frequency signal and the frequency of a time displaced swept frequency signal derived from the swept frequency signal; (iii) generating a signal to be transmitted by the radar from the swept frequency signal, (iv) producing a target difference-frequency signal from the signal transmitted by the radar and the signal returned to the radar from a remote target(s); (v) using an analogue-to-digital converter (ADC) to sample the target difference-frequency signal to provide a digitised target difference-frequency signal, the sampling rate of the ADC being derived from the frequency of the reference difference-frequency signal, and (vi) determining one or more frequency components of the digitised target difference-frequency signal, characterised in that the method further comprises the step of determining for at least one frequency component of the digitised target difference-frequency signal any phase difference between frequency sweeps of said swept frequency signal Advantageously, the step of determining any phase difference of said at least one frequency component between frequency sweeps of the swept frequency signal comprises the step of determining the phase of at least one frequency component of the digitised target difference-frequency signal corresponding to the return signal from at least one fixed range (real) target.

Conveniently, the method comprises the additional step of generating a fixed range artificial target difference-frequency signal from said swept frequency signal and a time displaced swept frequency signal derived from the swept frequency signal.

Preferably, the method also comprises the steps of (a) measuring the phase of at least one frequency component of the digitised target difference-frequency signal corresponding to the return from at least one fixed range target over a plurality of successive frequency sweeps and (b) using the phase measurements of step (a) to maintain the phase alignment of other frequency components of the digitised target difference-frequency signal over said plurality of successive frequency sweeps. Conveniently, step (a) comprises the step of monitoring the phase of said at least one frequency component for a jump in phase.

Advantageously, the method also includes the step of coherently integrating the phase aligned frequency components of the digitised target difference-frequency signal over a plurality of successive frequency sweeps.

Conveniently, the step of (iii) generating a signal to be transmitted by the radar from the swept frequency signal comprises the step of increasing the frequency of the swept frequency signal to a radio frequency (RF) signal for transmission by the radar. In such a case, the method may further comprise the step of producing a drift monitor artificial target difference-frequency signal having a frequency equal to the difference between the frequency of the up-converted RF signal transmitted by the radar and the frequency of a time displaced RF signal derived from the RF signal transmitted by the radar.

Preferably, the step of (iv) producing a target difference-frequency signal comprises the step of producing a target difference-frequency signal having in-phase (I) and quadrature phase (Q) components.

Advantageously, the step of (vi) determining the frequency components of the digitised target difference-frequency signal comprises the step of using a complex Fast Fourier Transform (FFT).

BRIEF DESCRIPTION OF THE DRAWINGS

The invention will now be described, by way of example only, with reference to the following drawings in which.

DETAILED DISCUSSION OF EMBODIMENTS

Figure 1A:
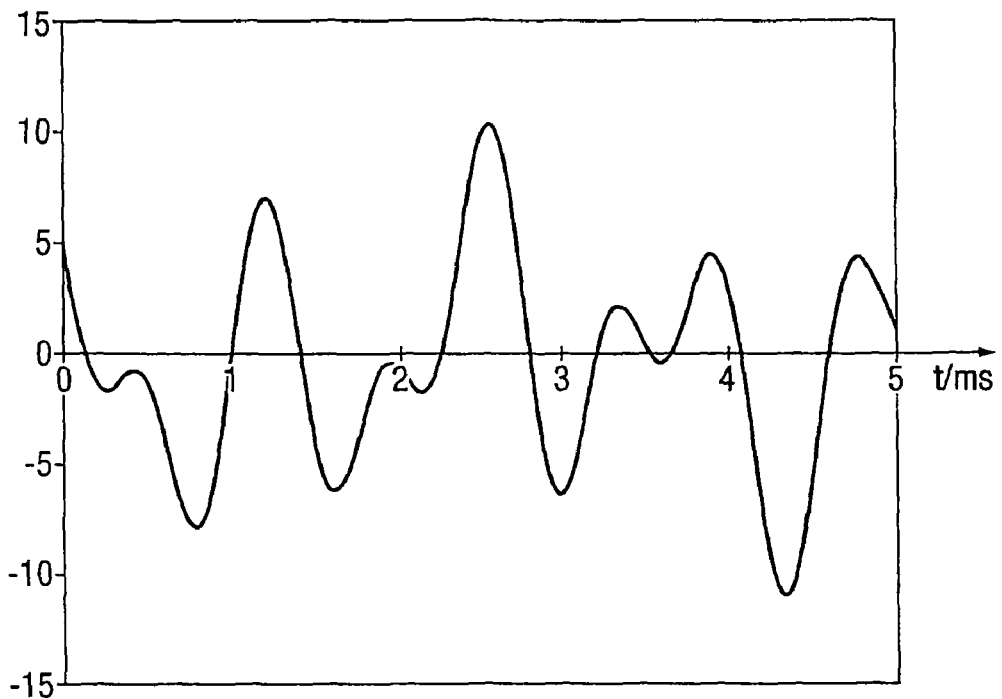
FIG. 1(a) shows the intensity of a received time domain signal after down-conversion and FIG. 1(b) shows the frequency of the transmitter output signal of a typical FMCW radar as a function of time.
Figure 1B:
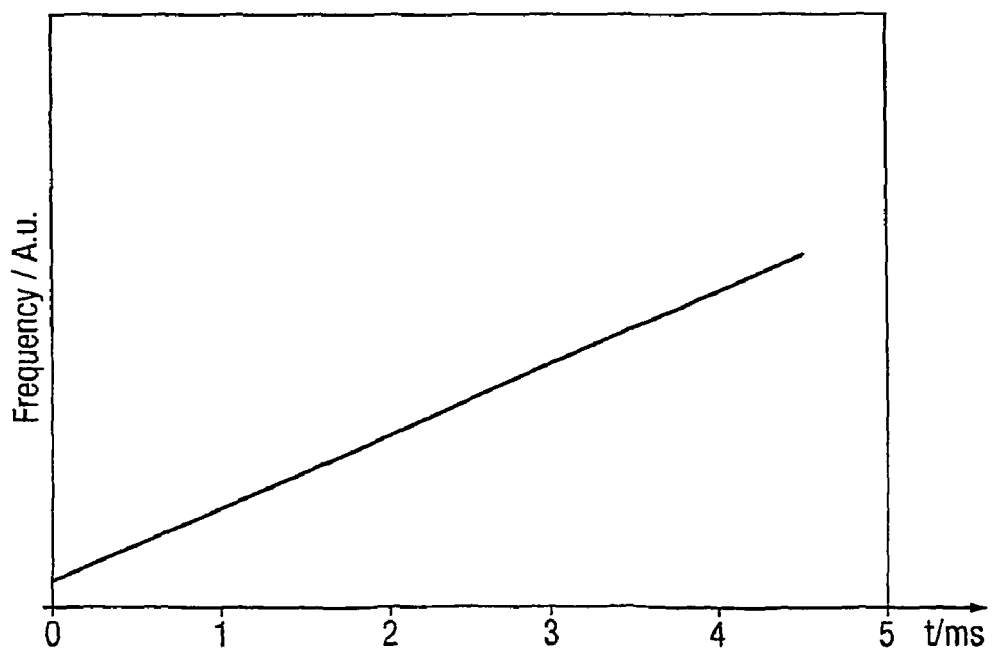

Referring to FIGS. 1(a) and 1(b), the underlying principle of an FMCW radar that is linearly swept in frequency is illustrated. FIG. 1a illustrates the amplitude of the received signal (after down-conversion) as a function of time for an FMCW radar whilst FIG. 1b illustrates the variation in frequency of the radar output as a function of time.

Figure 2A:
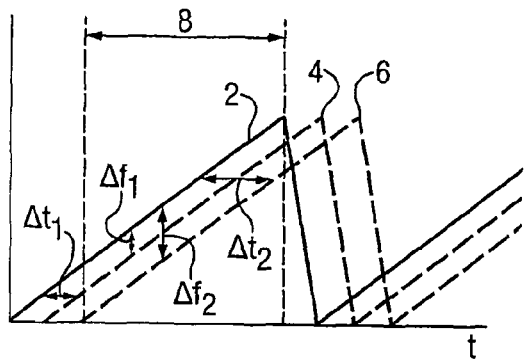
FIG. 2(a) shows the transmitted and received frequency signals of a FMCW radar.
Figure 2B:
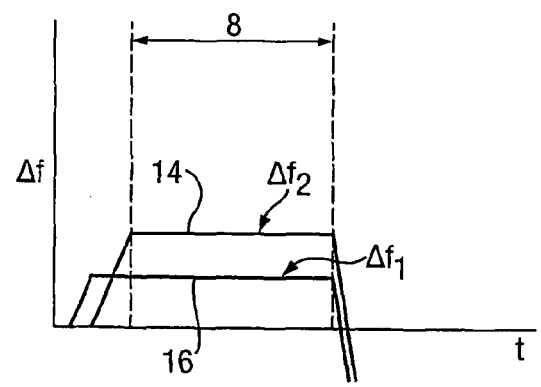
FIG. 2(b) shows the difference frequency components of the received signals and FIG. 2(c) shows resolved frequency components of the signal.
Figure 2C:
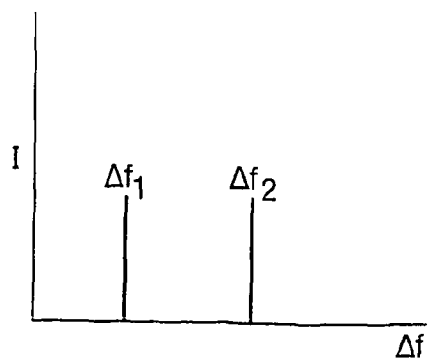

FIGS. 2(a), 2(b) and 2(c) illustrate how range information can be determined using an FMCW radar. Line 2 of FIG. 2a shows the saw-tooth frequency variation of the transmitted signal of the radar, line 4 shows the frequency variation with time of a signal returned from a target at a first distance $d_1$ from the radar and line 6 shows the frequency variation with time of a signal returned from a second target at a second distance $d_2$ from the radar. In this case, the target at $d_2$ is approximately twice the distance from the radar as the target at $d_1$.

It can be seen that line 4 is time shifted (i.e. delayed) from line 2 by $\Delta t_1$, whilst line 6 is time shifted by $\Delta t_2$ from line 2. This time shift depends on the time taken for the return signal to travel to the relevant target and back and is thus indicative of the range to the target. In this theoretical example, the variation of frequency with time is perfectly linear within the measurement window 8. It can thus be seen that the return from the target at $d_1$ is frequency shifted from the transmitted signal by the frequency $\Delta f_1$ within the whole of measurement window 8. Similarly, the return from the target at $d_2$ is frequency shifted from the transmitted signal by the frequency $\Delta f_2$.

In an FMCW radar, the return signal received by the radar is mixed with the transmitted signal. In an incoherent radar, this simply produces a difference or beat signal of a frequency (or containing a number of frequency components) equal to the difference in frequency between the transmitted and received signal. FIG. 2b illustrates the frequency component 14 that that would be produced by mixing the transmitted signal with the signal returned from the target at $d_1$ and the frequency component 16 that would be produced by mixing the transmitted signal with the signal returned from the target at $d_2$. A Fast Fourier Transform (FFT) technique provides a frequency analysis of these mixed signals over time within the measurement window 8 and provides the radar return intensity as a function of frequency as shown in FIG. 2c. The observed frequency shift (or target beat frequency $f_b$) is related to the range (R) of the target by the expression;

$$f_b = \frac{2R}{c} \frac{\Delta F}{\Delta T} \quad (1)$$

where c is the speed of light, $\Delta F$ is the frequency bandwidth (i.e. maximum frequency minus minimum frequency) and $\Delta T$ is the sweep duration. The gradient of the linear frequency sweep (i.e. $\Delta F/\Delta T$) is known, thereby allowing the range to the target(s) to be calculated from the measured beat frequency.

Figure 3A:
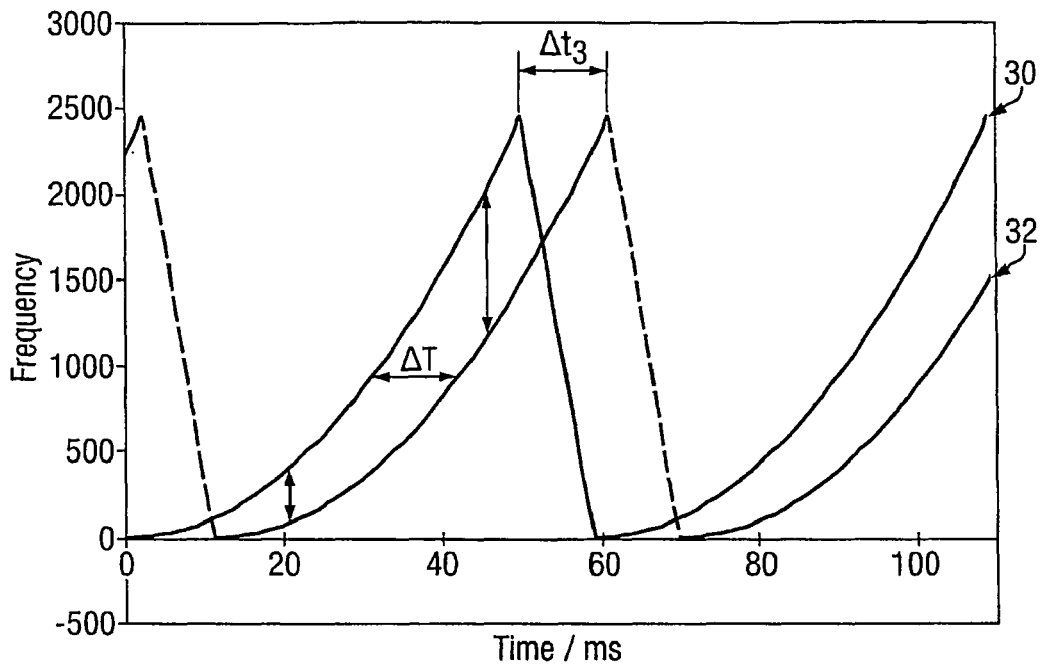
FIGS. 3(a) and 3(b) illustrate the effect of a non-linear frequency sweep on the output of an FMCW radar.
Figure 3B:
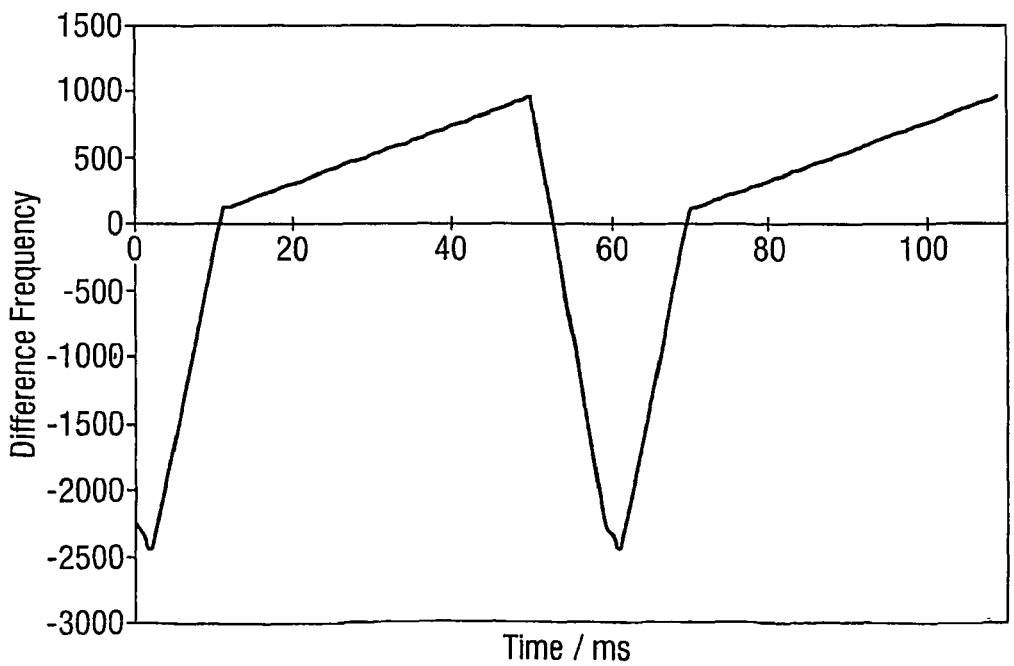

As noted above, a truly linear frequency sweep is difficult to obtain in a real radar system. Referring now to FIGS. 3(a) and 3(b), it can be seen how the use of a non-linear sweep frequency can seriously degrade the accuracy of the range information acquired by the radar. In particular, FIG. 3a shows a transmitted signal that has a non-linear frequency sweep signal (curve 30). Although the return signal (curve 32) is time shifted from the transmitted signal (curve 30) by a constant delay $\Delta t_3$, the frequency difference between the two signals is no longer constant with time. This can be seen from FIG. 3b in which the frequency difference (i.e. the beat frequency of the transmitted and received signal) is shown as a function of time. Non-linearity of the frequency sweep thus introduces a large error into the range measurement and it can be seen why providing a radar having a linear frequency sweep is desirable.

For coherent and incoherent operation, the linearity of the frequency sweep is an important factor. However, if coherent radar operation is required it is also necessary to ensure that the times at which the return signal is sampled correspond to the same absolute frequencies from sweep to sweep. Consequently, sampling the radar returns at intervals that are determined relative to the start of a frequency sweep will not provide coherent operation if the frequency sweep signal drifts in absolute frequency from sweep to sweep. However, in accordance with the present invention, it has been recognised that so long as it is ensured that the received signal is sampled at the same absolute frequency points during each sweep, it is possible to obtain coherent operation even if the initial absolute frequency of the frequency sweep varies from sweep to sweep.

Figure 4:
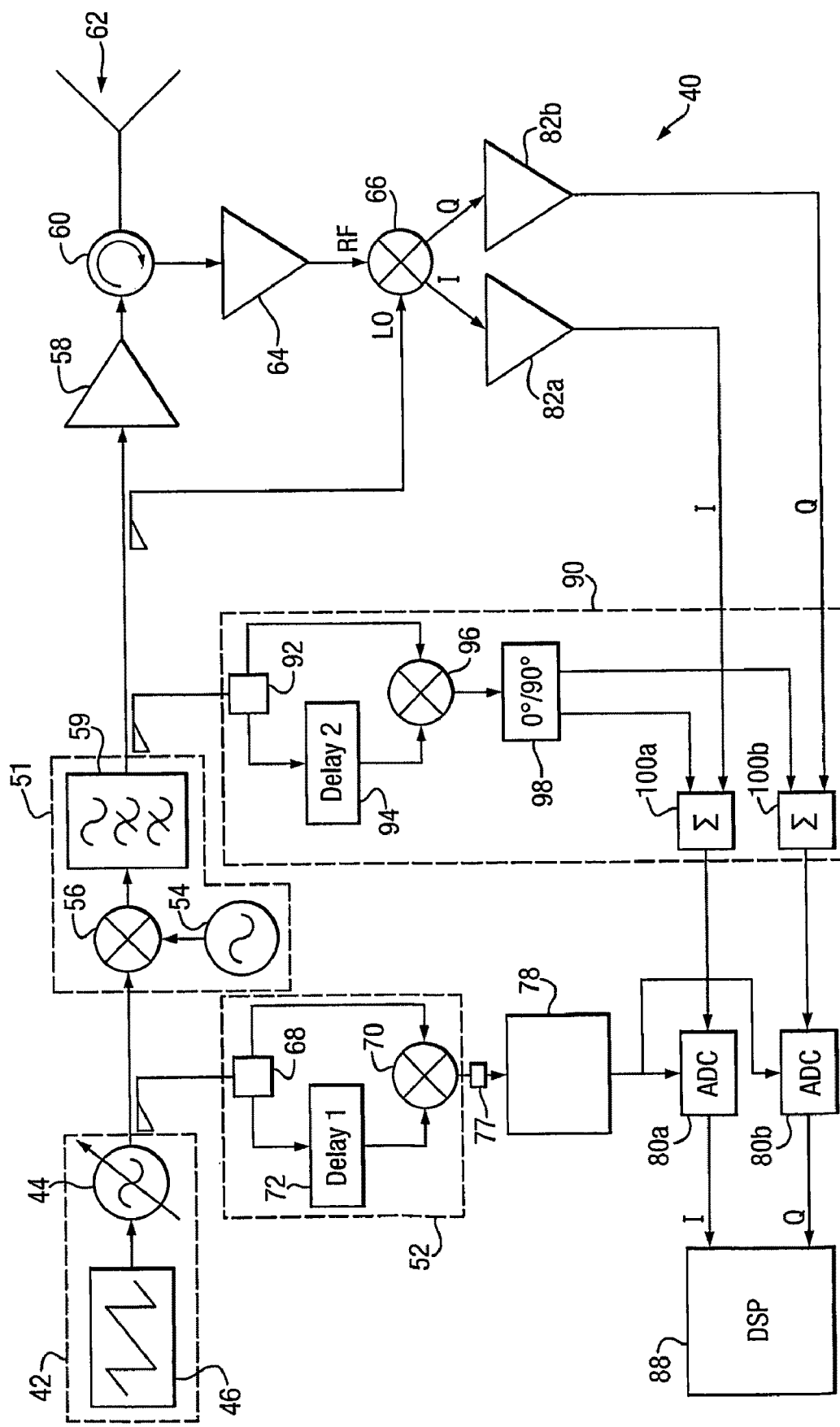
FIG. 4 is a block diagram illustrating a coherent FMCW radar of the present invention.

Referring now to FIG. 4, an FMCW radar 40 of the present invention is illustrated. The radar 40 comprises a frequency sweep generator 42 for outputting a saw-tooth frequency sweep signal at UHF frequencies. The frequency sweep generator 42 includes a voltage controlled oscillator (VCO) 44 arranged to receive a voltage control signal from a tuning signal generator 46.

The VCO 44 is a very low phase noise voltage controlled oscillator (VCO). Suitable VCOs are commercially available at low cost from a number of manufacturers and are commonly used in mobile telecommunication applications and the like. The VCO 44 has a monotonic tuning characteristic, but the tuning linearity of the VCO is not critical. The tuning signal generator 46 digitally generates a tuning signal and includes a filter (not shown) to remove digital quantisation noise. This allows digital pre-distortion of the VCO tuning signal thereby enabling the VCO to output a frequency sweep with a linearity of better than 10%. The frequency waveform is preferably saw-tooth in nature and bandwidths of at least 1500 MHz, corresponding to 10 cm range resolution, are readily achievable Although a digital tuning signal generator 46 is described, the skilled person would recognise that the VCO tuning signal could alternatively be generated by a simple analogue integrator circuit. Similarly, the frequency sweep generator could be arranged to produce alternative linear waveforms (e.g. triangular waveforms etc).

The output of the frequency sweep generator 42 is passed to a frequency up-converter 51 and a delay line discriminator 52. The frequency up-converter 51 comprises a stable local oscillator (STALO) 54 and a first frequency mixer 56 which up-converts the low frequency signal received from the frequency sweep generator 42 to the desired RF operating frequency (typically around 94.5 GHz). A sideband reject filter 59 is provided to remove the lower sideband from the RF frequency signal; it should be noted that the upper side band could alternatively be removed from the RF signal.

The up-converted RF signal (which now contains only the upper side band) is then amplified by an RF power amplifier 58 and passed through a circulator 60 to the antenna 62. The return signal received by the antenna 62 is passed, via the circulator 60, to a low noise amplifier 64. The amplified return signal output by the low noise amplifier 64 is then mixed, using the In-phase Quadrature (IQ) frequency mixer 66, with an extract of the RF signal output. In other words, the radar returns from the target(s) are converted directly to baseband by IQ frequency mixing with a sample of the signal currently being transmitted.

The I and Q baseband return signals are separately amplified by amplifiers 82a and 82b respectively and are then passed to a pair of analogue to digital converters (ADC) 80a and 80b. An anti-alias filter (not shown) may also be provided to reject any frequency components of the signal (including noise) that have a frequency greater than a predetermined level. The anti-alias filter is typically arranged to reject anything having a frequency greater than the Nyquist frequency.

It should be noted that the radar can be configured either as a single antenna system using the same antenna for transmit and receive (i.e. a monostatic arrangement) or as a dual antenna system with separate antennas for transmit and receive (i.e. a bistatic arrangement). Although a monostatic antenna arrangement is shown in FIG. 4 for simplicity, the bistatic arrangement is generally preferred as it has the advantage of providing better isolation of transmitter phase noise from the receiver.

As outlined above, a portion of the signal output by the frequency ramp generator 42 is also fed to the delay line discriminator 52. The delay line discriminator 52 comprises a further divider 68, a further frequency mixer 70 and a delay line 72. The further divider 68 of the delay line discriminator 52 splits the received VCO signal into two paths. The first path passes the signal straight to the local oscillator port of the further frequency mixer 70. The second path passes the VCO signal to the RF input port of the frequency mixer 70 via the delay line 72.

The delay line 72 is implemented optically. The electrical VCO signal received by the delay line 72 is used to modulate the current supply to a solid state semiconductor laser (not shown), such as a distributed feedback (DFB) or distributed Bragg reflector (DBR) laser. Modulation of the laser current supply causes intensity modulation of the laser output. Laser diodes are presently commercially available that can be intensity modulated at rates up to around 18 GHz, and laser diodes have been reported that can be modulated at rates up to 70 GHz. The modulated laser light is then passed along a length of single mode optical fibre (not shown) before being converted back to an electrical signal by an optical detector (not shown). Optical detectors that can operate at the modulation rates of such solid state laser are also commercially available from a number of sources.

A suitably long delay time is thus achieved by modulating the electrical signal output by the VCO onto an optical carrier, passing it down a length of optical fibre and then demodulating the optical signal back to an electrical signal. The use of an optical fibre line enables large bandwidths of several gigahertz to be delayed by substantial periods equivalent to many tens of kilometers with virtually no loss. In addition, fibre optic delay lines have very low frequency dispersion which can be a limiting factor in RF coaxial lines, particularly over large temperature variations. As explained in more detail below, the length of the optical fibre delay line is selected to impart a delay that is equivalent to the delay that would be produced by a target at the maximum instrumented range of the radar, or is twice that length. More information about such optical delay lines can be found in our co-pending patent application GB 0421520.8 (Agent's Ref: IP/P7395/F1GB).

The use of an optical fibre delay line thus removes the range limitations associated with the use of coaxial delay lines. Switchable optical delay lines or multi-tapped optical delay lines can also be readily provided to allow radars to be produced that have switchable maximum instrumented ranges. Furthermore, and unlike systems which employ surface acoustic wave (SAW) delay lines, there is no trade off between the length of delay and the maximum achievable bandwidth. It should be noted that the delay imparted by the optical fibre delay line could subsequently be increased electronically, for example using a phase locked loop. It should also be noted that non-optical (e.g. co-axial) delay lines could be used in devices that have a relatively short maximum range such as fluid level measurement radars etc.

The output of the delay line discriminator 52 is passed to a zero crossing detector 78 via a selectable frequency doubler 77. The zero crossing detector 78 is arranged to generate a clocking pulse whenever the voltage of the signal output by the delay line discriminator 52 crosses zero. These clocking pulses are used to define the sampling times of the analogue to digital converter (ADC) elements 80a and 80b (hereinafter collectively referred to as ADC 80) that are used to sample the radar returns. The zero-crossing detector 78 can be implemented either by hard-limiting the output of the delay line discriminator 52 and using a comparator to generate the ADC clock signal. Alternatively, in cases where the ADC 80 accepts a sine-wave clock, the output of the delay line discriminator 52 can simply be amplified to the required level for the ADC 80. In this manner, the non-linear effects of the frequency sweep generator 42 (in particular the VCO 44) will have been compensated for and near-perfect frequency linearity is achieved. Furthermore, again due to the non-linear sampling of the ADC, spurious frequency spurs often associated with ADCs are smeared out and effectively eliminated.

The digitised output of the ADC 80 is fed to a digital signal processor (DSP) 88 which extracts the frequency components of the returned radar signal. These frequency components are, because of the linearisation technique, directly related to range. The operation of the DSP to provide coherent operation is described in more detail below.

It should be noted that the sweep linearity of the final RF signal will also depend on the stability of the STALO. In some FMCW radar systems, typically operating below 20 GHz, the STALO is sufficiently stable in frequency that compensation before up-conversion is sufficient and compensation at the final RF is not required. However at higher frequencies (e.g. millimeter frequencies such as 94 GHz) the STALO frequency can drift from sweep to sweep. In such cases, radar performance can be improved by implementing compensation at the final RF frequency. Ideally, this compensation would be carried out using a reference target equivalent to the radar's maximum range allowing the low frequency circuitry (i.e. delay line discriminator 52) to be omitted. The ADC clocking signal could then be generated using a delay line discriminator operating at the final RF frequency. However, it is typically impractical to provide a delay line at the final RF frequency that imparts a delay anywhere near to that provided by a target near the maximum range of the radar; at millimeter wave frequencies both coaxial cable and waveguide are extremely expensive and very lossy. However, it has been found that the addition of a further delay line discriminator at the final RF frequency can provide sufficient information, even when a relatively short RF delay line is employed, to correct for frequency drift of the STALO.

The FMCW radar 40 thus includes an RF delay line discriminator 90. The RF delay line discriminator 90 comprises a divider 92, an RF delay line 94 and an RF frequency mixer 96. The baseband signal output by the RF frequency mixer 96 is split into two by the phase shifting splitter 98. The two signals output by the phase shifting splitter 98 are arranged to have a phase difference of 90° and are separately combined using signal combiners 100a and 100b with the I and Q signals provided by the in-phase Quadrature (IQ) frequency mixer 66.

The reference signal produced by the RF delay line discriminator 90 is at a known range (i.e. the delay imparted by the RF delay line 94 is fixed) and its phase can thus be measured by the DSP 88 from sweep to sweep. The difference in phase from one sweep to the next is calculated and the phase of each of the other range cells can be adjusted using the scaling factor;

$$\frac{n}{n_{ref}} \quad (2)$$

where n is the range cell number to be adjusted and $n_{ref}$ is the range cell number of the reference cell. Despite the fact that the delay imparted by the RF delay line 94 is typically much less (e.g. <5%) than the delay associated with a target at maximum range, variations in the phase of the baseband signal output by the RF frequency mixer 96 are indicative of any frequency variation of the STALO 54. Analysis of the I and Q baseband signals of the RF delay line discriminator 90 by the DSP 88 thus allows for any variation in the frequency of the STALO to be corrected. It should be noted that the addition of the RF delay line discriminator 90 allows for the correction of any mean frequency variation in the output RF signal from sweep to sweep but it does not provide information on any instantaneous drift in frequency during a sweep.

The combination of the delay line discriminator 52 with the RF delay line discriminator 90 has thus been found to remove non-linearities associated with both the VCO and any frequency drift of the STALO. The provision of the RF delay line discriminator 90 is thus preferred, although it should be noted that it is by no means essential.

As explained above, it is not practical to provide an RF delay line 94 that imparts a delay equivalent to a target at the maximum range of the radar. For example, the radar may be arranged to have a maximum range of up to several kilometers but providing a RF delay line of an equivalent length would be extremely difficult, if not impossible, to implement. However, it is desirable to provide as long a length of RF delay line as possible. Presently, waveguides suitable for carrying 94 GHz radiation are only available as "off the shelf" components in lengths of up to around three meters. A number of such RF waveguides can thus be joined to make lengths of up to around thirty meters.

Figure 5:
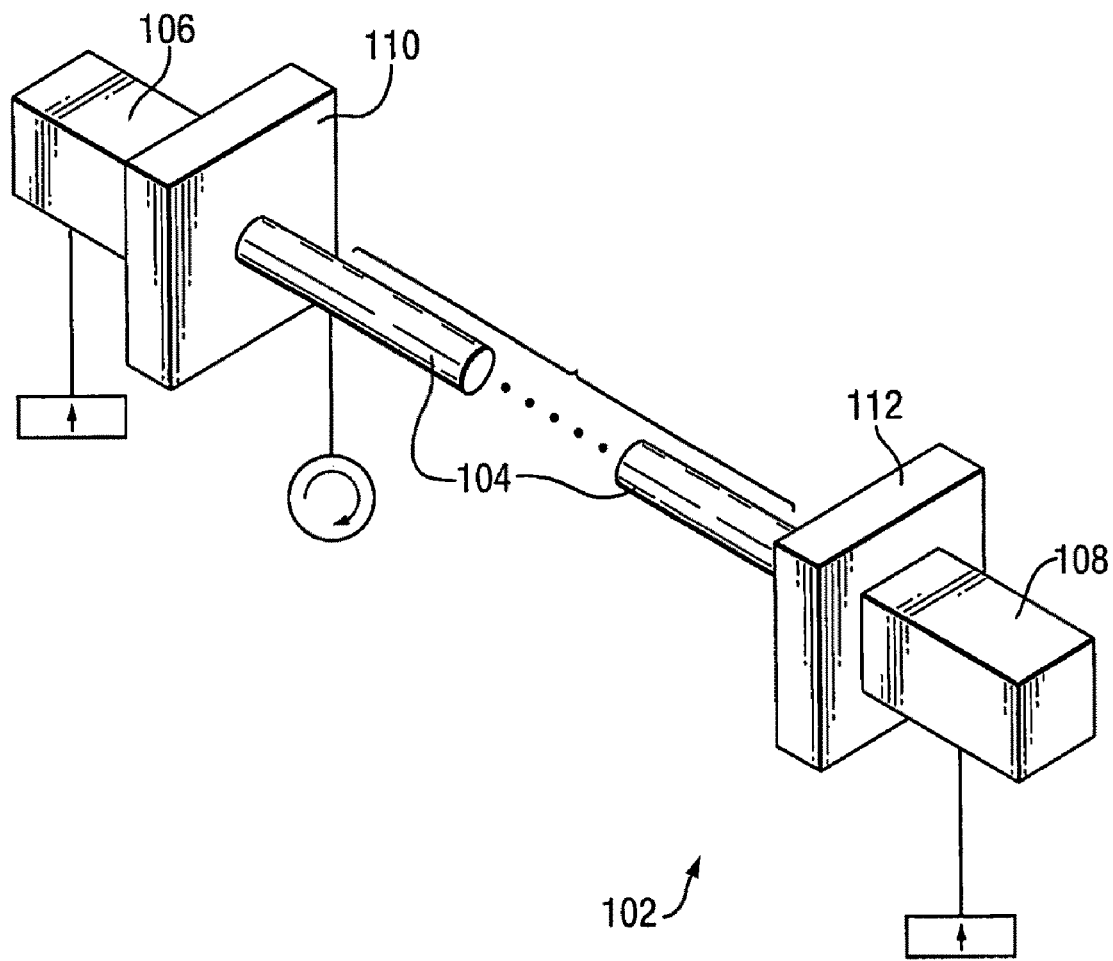
FIG. 5 shows a RF delay line suitable for inclusion in the device of FIG. 4.

Referring to FIG. 5, an RF delay line 102 is illustrated that could be provided in place of an "off the shelf" waveguide. The RF delay line 102 is particularly suitable for use as the RF delay line 94 of the FMCW radar 40 described with reference to FIG. 4. The RF delay line 102 comprises a length of tubing 104 of circular cross-section located between an input waveguide 106 and a output waveguide 108 of rectangular cross-section. A linear to circular polarisation converter 110 is located between the input waveguide 106 and the tubing 104. A circular to linear polarisation converter 112 is located between the tubing 104 and the output waveguide 108.

In use, the input waveguide 106 carries linearly polarised RF radiation which is converted to circularly polarised radiation by the linear to circular polarisation converter 110. The circularly polarised RF radiation is coupled into the tubing 104.

On exiting the tubing 104, the circular to linear polarisation converter 112 converts the polarisation of the radiation that exits the tube back to linear and the resulting radiation is coupled into the output waveguide 108.

The RF delay line 102 benefits from the relatively low cost of metal tubing having the correct internal diameter to propagate the required waveguide mode. For example, metal micro-bore tubing could be used. Furthermore, the use of tubing having a substantially circular cross-section removes any requirement for aligning the waveguide along its length and allows the tubing to be rolled into a compact arrangement.

Referring now to FIGS. 6(a) to 6(e), a brief summary will be given of the operation of the non-linear sampling technique that can be implemented using the apparatus of FIG. 4. It should be noted that the basic concept of using non-linear sampling to dynamically change the interval at which the return signal is sampled to compensate for the non-linearity of the frequency sweep generator has been described previously in GB2083966 and GB1589047.

Figure 6A:
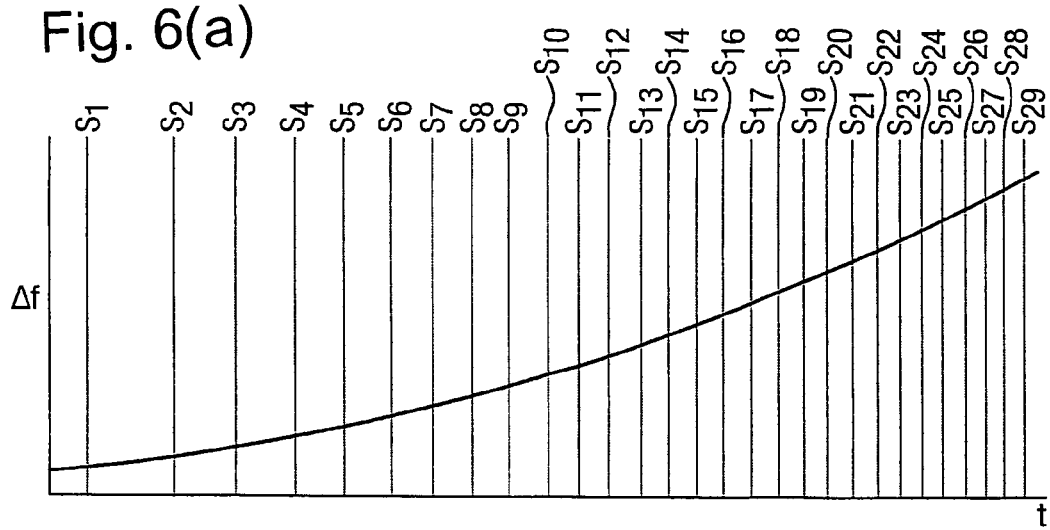
FIGS. 6(a) to 6(e) illustrate the principle of operation of the linearization technique used in the radar apparatus of FIG. 4.

Referring to FIG. 6a, the frequency difference (Δf) between the frequency sweep signal and the delayed frequency sweep signal produced by delay line discriminator 52 is shown. It can be seen that although the delay introduced by delay line 72 is fixed, the non-linearity of the frequency sweep produces a variation in the frequency difference (Δf) between the frequency sweep signal and the delayed frequency sweep signal over a sweep period. This is the same effect described with reference to FIGS. 3(a) and 3(b).

It is well known that mixing two signal produces a signal having a frequency equal to the frequency difference between those two signals. Mixing the frequency sweep signal and the delayed frequency sweep signal thus produces a resultant "beat" signal that has a frequency that varies with time in the manner illustrated in FIG. 6b. A signal of the type illustrated in FIG. 6b will thus be generated by the delay line discriminator 52 on receipt of a highly non-linear frequency sweep signal.

Figure 6B:
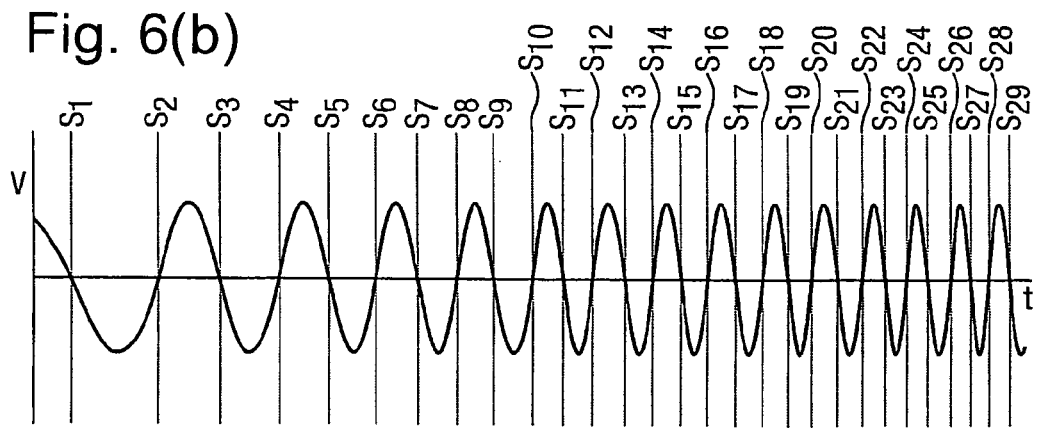
Figure 6C:
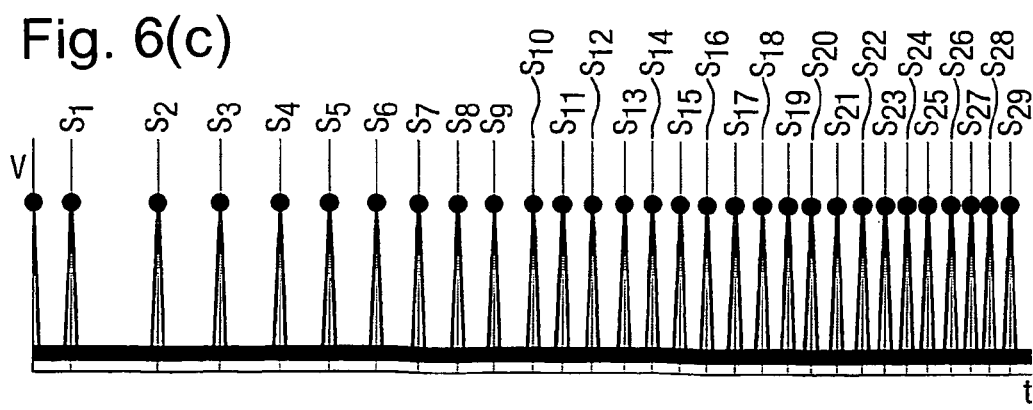

The zero-crossing detector 78 takes the signal shown in FIG. 6b and produces therefrom the clocking pulses shown in FIG. 6c. In this case, the delay line length is equivalent to the delay of a signal returned from maximum instrumented range and the frequency doubler 77 is activated thereby doubling the frequency that is output by the discriminator. The zero-crossing detector is arranged to generate clock pulses on both negative and positive zero-crossings so that the sampling rate satisfies the Nyquist criteria; i.e. so that sampling occurs at a frequency that is twice the frequency of the highest frequency component of the signal being sampled. If the delay is equivalent to twice the maximum instrumented range and the frequency doubler 77 is activated, then only the positive, or negative, zero-crossings are required. However, for a delay equivalent to twice the maximum instrumented range it would be preferred to deactivate (i.e. bypass) the frequency doubler 77 and use the zero crossing detector to generate clock pulses on both negative and positive zero-crossings. These clock pulses determine the points in time at which the ADC 80 samples the I and Q baseband return signals and are illustrated by dashed lines $S_1$ to $S_{29}$ in FIGS. 6(*a*) to 6(*e*).

Figure 6D:
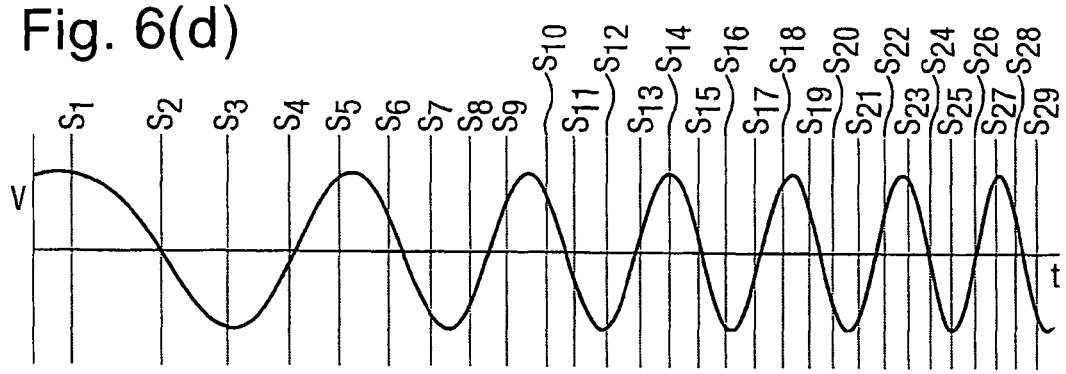

FIG. 6*d* shows an example of an I baseband return signal that is fed to the ADC element 80*a*. As described above, the baseband return signal of FIG. 6*d* is generated by mixing the return radar signal with a portion of the signal being transmitted. The return signal can be seen to have a frequency that varies with time in a manner analogous with the signal of FIG. 6*b*; this again arises from the non-linearity of the frequency sweep causing the frequency difference between the return and transmitted signal to vary over the sweep period. The waveform of FIG. 6*d* is sampled by the ADC 80 at the interval times S1 to S29 that are generated by the zero crossing detector 78.

Figure 6E:
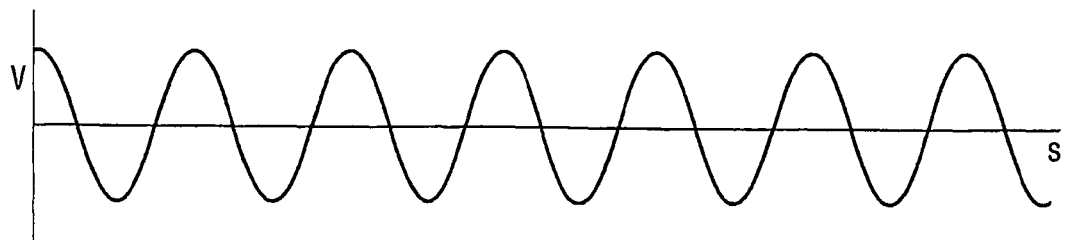

FIG. 6*e* shows the sampled waveform of FIG. 6*d* re-plotted assuming a fixed sampling interval. In other words, the signal is replotted as a function of sampling time "s" as determined by the zero crossing detector 78 and not as a function of real time. It can be seen that the non-linearity of the frequency response has been removed by this process and a signal is passed to the DSP 88 that has a constant frequency. This allows the range to be readily and unambiguously extracted from the signal. It should be noted that the baseband return signal of FIG. 6*d* has radar returns from a target at a single range; in reality many difference range components may be present each of which can be resolved by the DSP 88 from the resulting linearised signal output by the ADC 80.

As mentioned above, an advantage of this apparatus is that the delay line discriminator 52 can comprise a number of switchable optical delay lines and/or a multi-tap optical delay line. This allows a radar to be provided in which the delay imparted by the optical fibre delay line can be altered during use. However, it should be noted that alteration of the imparted delay will also have an effect on the performance parameters and system settings of the radar. It may thus be necessary, depending on the desired use of the radar, to alter other properties of the radar when the imparted delay to the swept frequency signal is changed.

As an example, the following equations (3) to (6) can be used to define various properties of the radar where $R_{max}$ is the maximum radar instrumented range, the delay line length is $R_{max}$ or $2R_{max}$, $\Delta F$ is the sweep bandwidth and $\Delta T$ is the duration of sweep.

The range resolution ($\Delta R$) can be described by:

$$\Delta R = \frac{c}{2\Delta F} \quad (3)$$

The number (N) of time samples, which is related to the required FFT length, will be given by;

$$N = \frac{4R_{max}\Delta F}{c} \quad (4)$$

The sample rate (S) can be expressed as:

$$S = \frac{4R_{max}\Delta F}{c\Delta T} \quad (5)$$

The anti-alias filter cut-off frequency ($F_{filter}$) will be:

$$F_{filter} = \frac{2R_{max}\Delta F}{c\Delta T} \quad (6)$$

Following from equations (3) to (6), table 1 shows the effect on the radar resolution, the required FFT length, the required sample rate, the required anti-alias filter cut-off and the maximum range when halving delay line length (i.e. from $2R_{max}$ to $R_{max}$), frequency sweep or sweep duration. It should be noted that halving the resolution of the system means doubling the size of the range-azimuth cells.

TABLE 1

| | Result of halving specified parameter | | | | |
|---|---|---|---|---|---|
| | Resolution | FFT length | Sample rate | Filter cut-off | Maximum range |
| Delay line length | No change | Halves | Halves | Halves | Halves |
| Frequency sweep | Halves | Halves | Halves | Halves | No change |
| Sweep duration | No change | No change | Doubles | Doubles | No change |

It can be seen that the various radar configuration and performance criteria are governed by a complex interrelationship and that a radar system of the present invention could be configured in numerous different ways.

Table 2 gives an example of how a multi-tap optical delay line could be used to implement a radar that is switchable between four different ranges. The sweep time of the radar is fixed at 3.2768 ms, the FFT length is fixed at 16 k points, the sampling frequency is fixed at 5 Msps and the anti-alias filter cut-off is fixed at 2.5 MHz. As noted above the delay line length can be easily altered, the frequency sweep is readily changeable by reprogramming the voltage tuning signal applied to the VCO 44 of the frequency sweep generator 42 and the clock factor (i.e. whether the zero-crossing detector 78 clocks 1 zero crossing per cycle or 2 zero crossings per cycle) can be changed by activating/deactivating the frequency doubler 77. Therefore, alteration of the frequency sweep, optical delay line length and clock factor can be seen to provide a radar that can operate with a maximum range of around 0.5 km, 1 km, 2 km or 4 km. A radar that has a range which can be easily altered during use is thus provided.

TABLE 2

| Multi-tap optical fibre device configurations. | | | | |
|---|---|---|---|---|
| | 1 | 2 | 3 | 4 |
| Frequency sweep/MHz | 2400 | 1200 | 600 | 300 |
| Delay line length/m | 1024 | 1024 | 2048 | 4096 |
| Clock factor | 1 | 2 | 2 | 2 |
| Range resolution/m | 0.0625 | 0.125 | 0.25 | 0.5 |
| Maximum range/m | 512 | 1024 | 2048 | 4096 |

In addition to the above advantages, the inventors have also appreciated that the ADC sampling technique described with reference to FIGS. 4 and 6(*a*) to 6(*e*) ensures that each swept waveform is always sampled at the same absolute frequency points. In other words, the zero crossing points used to clock the ADC must always occur at the same absolute frequency points within the frequency sweep.

This can be explained by considering a signal of the form A sin(ωt) at the input of the delay line discriminator 52. The signal is delayed by the delay line 72 by the delay time, Δ. At the mixer 70 the signals A sin(ωt) and A sin(ω(t−Δ)) are multiplied together to give;

$$A^2 \frac{\cos(\omega\Delta)}{2} - A^2 \frac{\cos(\omega(2t-\Delta))}{2} \quad (7)$$

The higher frequency term is rejected at the output of the mixer leaving;

$$A^2 \frac{\cos(\omega\Delta)}{2} \quad (8)$$

The zero crossing detector will thus generate an ADC clock pulse whenever;

$$\omega\Delta = \frac{\pi}{2} + n\pi \quad (9)$$

or, $$2f\Delta = \frac{1}{2} + n \quad (10)$$

This means that clock pulses are generated every time the frequency changes by;

$$\frac{1}{2\Delta} \quad (11)$$

It can thus be seen that the delay line discriminator 52 when combined with the zero crossing detector 78 not only generate pulses at regular, fixed frequency intervals but also provides ADC sample points at fixed absolute frequencies (e.g. F1, F2, F3 etc.). This technique, rather unexpectedly, lends itself to coherent sampling from sweep to sweep.

Although the above described technique samples the frequency swept waveform at consistent absolute frequencies from sweep to sweep, the first frequency sample point may still vary from sweep to sweep. This is caused, for example, if the start frequency of the frequency sweep produced by the VCO drifts with time and/or temperature.

Figure 7:
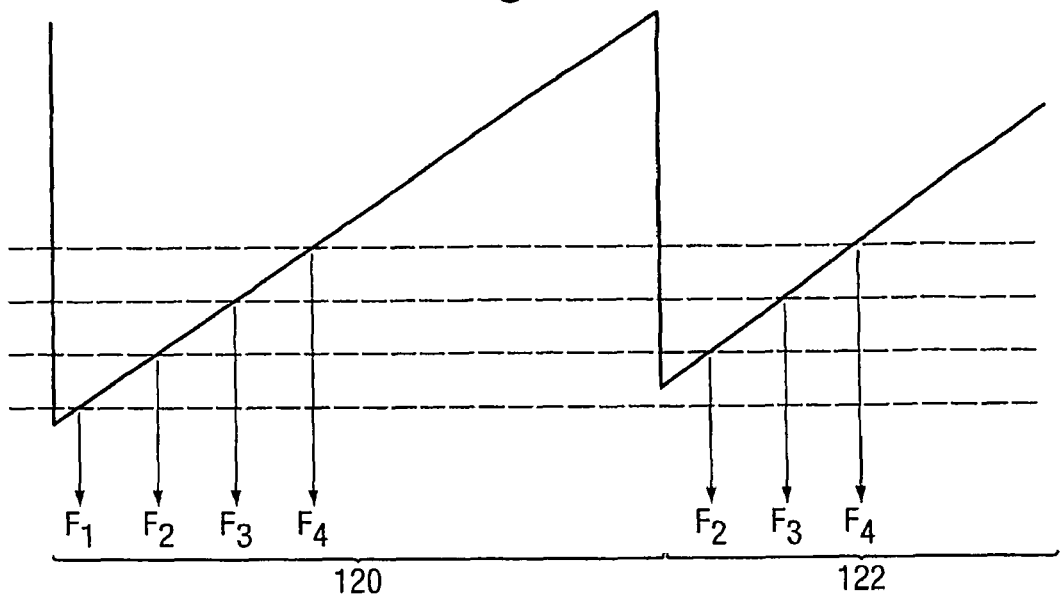
FIG. 7 illustrates the effect of a change in the start frequency of a frequency sweep of the radar of FIG. 4, FIGS. 8(a) and 8(b) illustrate the phase jump of the successive frequency sweeps shown in FIG. 7.

Referring to FIG. 7, the effect of variations in the start frequency of successive frequency sweeps is shown. In particular, FIG. 7 shows a first frequency sweep 120 and a second frequency sweep 122 of a saw-tooth waveform. During the first frequency sweep 120, the ADC will be clocked to sample frequencies F1, F2, F3, F4 etc. However, during the next sweep the ADC is clocked to sample frequencies F2, F3, F4 etc.

FIGS. 8(*a*) and 8(*b*) illustrate how the variation between the first and second frequency sweeps shown in FIG. 7 effects the ADC output for a return signal from a target at a fixed range. It should be noted that FIGS. 8(*a*) and 8(*b*) show the return signal as a function of sampling time "s" as derived from the zero crossing detector 78. The waveforms of FIGS. 8(*s*) and 8(*b*) are thus corrected for any non-linearity in the frequency sweep and are therefore analogous to the waveform shown in FIG. 6*e*.

Figure 8A:
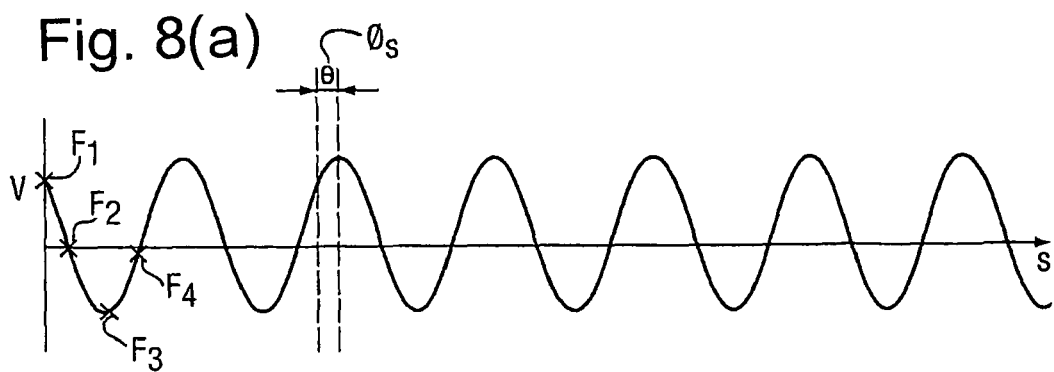
Figure 8B:
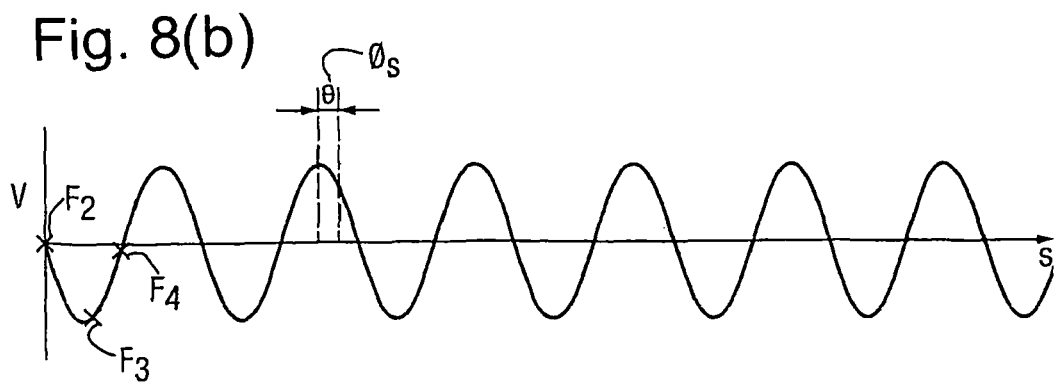

FIG. 8*a* shows the sampled baseband return signal from a fixed position target when the first frequency sweep 120 of FIG. 6(*a*) is transmitted. FIG. 8*b* shows the sampled baseband return signal from the same target when the second frequency sweep 122 of FIG. 6(*a*) is transmitted. It can clearly be seen from FIGS. 8*a* and 8*b* that the omission of frequency F1 from the second frequency sweep 122 results in the sine waves of the successive frequency sweeps being out of phase. In other words, the sine wave of FIG. 8*b* is shifted in phase relative to the sine wave of FIG. 8*a* by a phase difference of ϕ$_s$. For each frequency step (e.g. from F1 to F2) the associated phase jump is:

$$\frac{n\pi}{N} \quad (12)$$

where n is the target range cell number and N is the total number of range cells. So, for a target at maximum range, a phase jump of π radians would be expected if measurements were made using the successive waveforms shown in FIG. 7. At ranges less than the maximum range, the phase change is less than π radians by an amount that is directly proportional to target range.

The introduction of a phase shift in the ADC output between successive frequency sweeps prevents coherent integration of the sampled waveforms. However, because the phase shifts appear as "jumps", the effect can be overcome by recognising any such phase jumps and applying an appropriate phase adjustment to bring the phases of successive sweeps in line. Note that this is only practical because the ADC sampling points have a fixed absolute frequency and hence any phase shift between successive frequency sweeps due to variations in the first frequency that is sampled will appear as a discrete phase jump.

Figure 9:
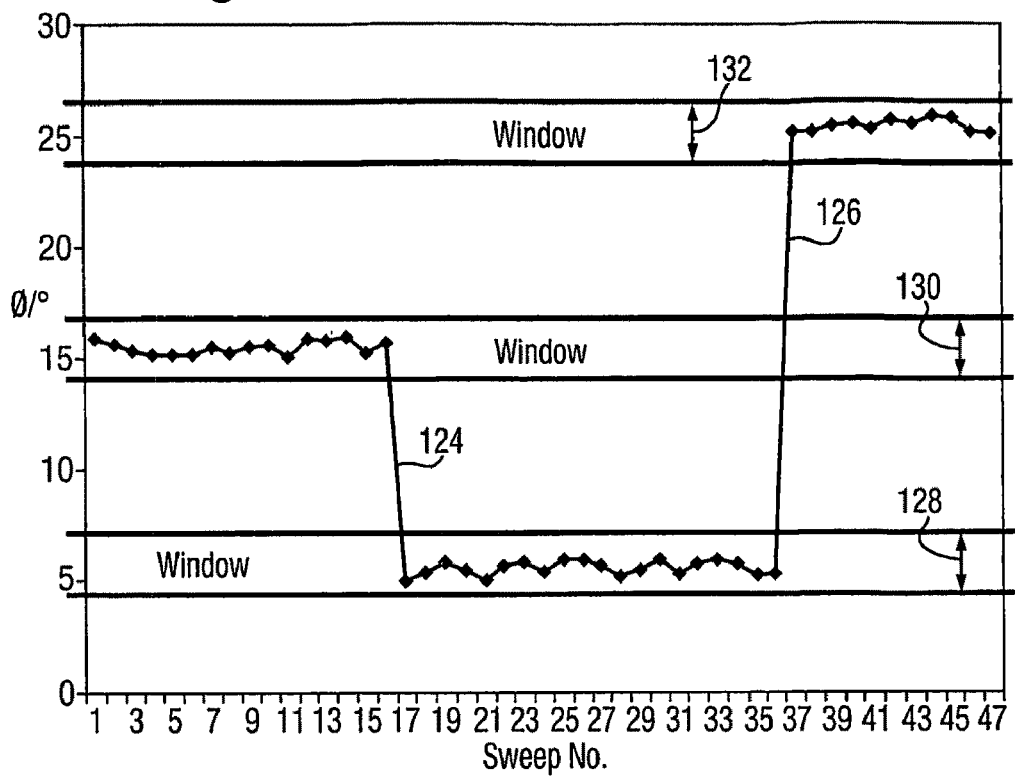
FIG. 9 shows the phase of a single target for successive frequency sweeps.

Referring to FIG. 9, the phase of a return signal from a target at a fixed range is shown for forty-seven successive scans. It can be seen that there are steps 124 and 126 in the phase of successive measurements arising from variations in the start frequency of the frequency sweep.

One way to identify phase jumps is to use the return signals from one or more targets of opportunity. The range to each target of opportunity can be readily determined from the frequency of the associated sampled signal and the phase jump that would occur if the first sample point of the waveform altered can thus be predicted. Suitable threshold windows (e.g. 128, 130, 132) can thus be provided to detect any such phase jump. If a phase jump is detected in this manner, the scaled phase jumps for all other target ranges are calculated. The phase jump corrections are then applied so that all steady targets have a continuous phase.

Figure 10:
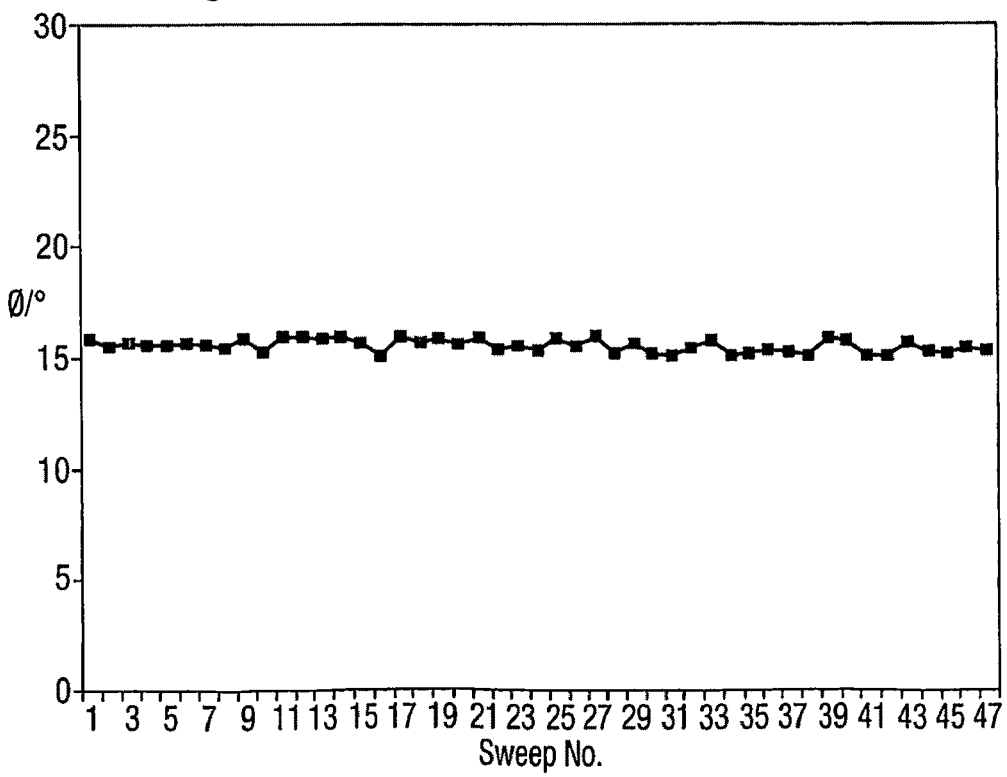
FIG. 10 shows the phases of a single target for successive frequency sweeps when the compensation technique of the present invention is employed.

FIG. 10 shows the resultant phase of a single target after the phase jump correction has been applied. Note that the windowing prevents any residual phase noise looking like a phase jump. The residual phase noise will be due to thermal noise in the receiver and any movement of the target. The best targets to use for phase jump prediction are the long range targets where the phase jump is largest and it dominates the residual noise.

Figure 11:
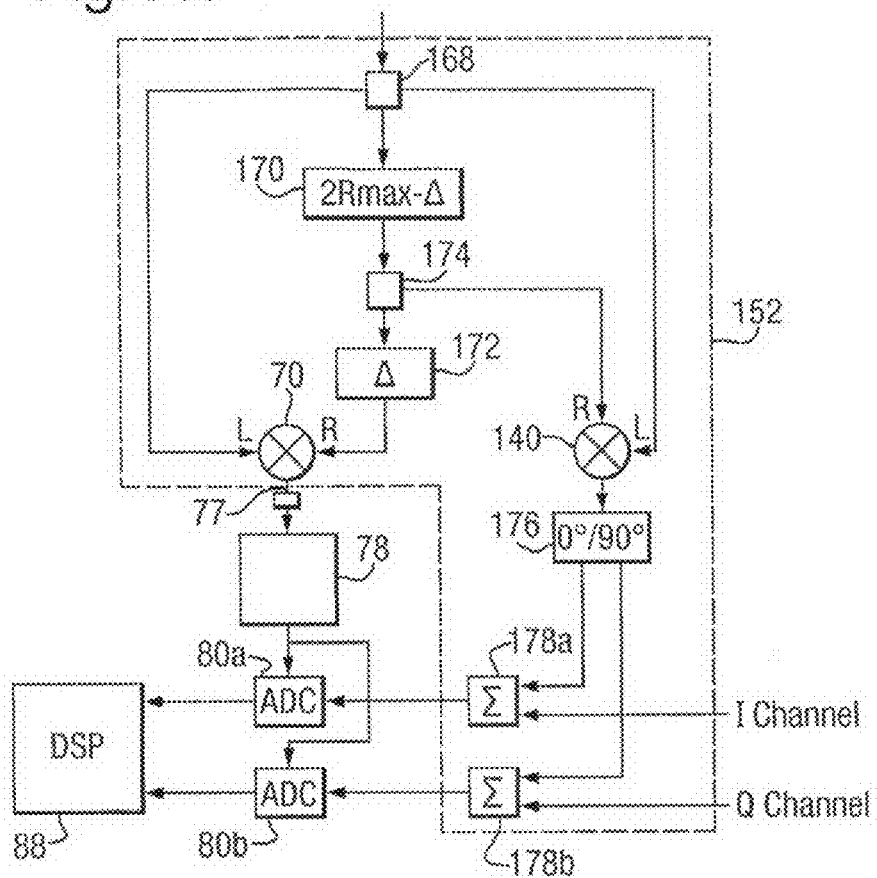
FIG. 11 illustrates a modification to the FMCW radar design of FIG. 4 to allow an artificial target signal to be provided.

An alternative to using targets of opportunity is to provide additional, preferably low frequency, circuitry that creates a false or artificial target. FIG. 11 illustrates how the delay line discriminator 52 of FIG. 4 could be modified to provide a delay module 152 that not only provides the delay line discriminator function but also generates an artificial target signal. Components of the delay module 152 shown in FIG. 11 that are analogous to those of the delay line discriminator 52 illustrated in FIG. 4 have been assigned like reference numerals.

The delay module 152 comprises a three way splitter 168, a first frequency mixer 70 and a second frequency mixer 140. The three way splitter 168 receives a frequency swept signal from the frequency sweep generator and passes said signal to the local oscillator ports of both the first and second frequency mixers 70 and 140. A signal from the three way splitter 168 is also passed through a first delay line 170, a signal splitter 174 and a second delay line 172. The first delay line 170 imparts a delay equivalent to the time of flight of a signal to twice the maximum range of the radar (2R) minus a small distance ($\Delta$) whilst the second delay line 172 imparts a delay equivalent to the time of flight of a signal over the small distance ($\Delta$). The first frequency mixer 70 is arranged to receive the signal passed through both the first and second delay lines 170 and 172, whereas the second frequency mixer 140 receives a signal that has passed only through the first delay line (i.e. a signal extracted using the signal splitter 174).

The first frequency mixer 70 thus receives a local oscillator signal and a signal to which a delay equivalent to twice the maximum range of the radar has been imparted. The output of the first frequency mixer 70 is then passed to a zero crossing detector 78 via a selectable frequency doubler 77. The zero crossing detector 78 is arranged to output timing pulses that are used to clock the ADC 80. It can thus be seen that the delay module 152 shown in FIG. 11 will provide a signal to the zero crossing detector 78 that is equivalent to the signal produced by the delay line discriminator 52 shown in FIG. 4.

The second frequency mixer 140 receives a local oscillator signal and a signal to which a delay has been imparted that is equivalent to twice the maximum range of the radar minus the small distance ($\Delta$). The second frequency mixer 140 thus outputs a beat signal equivalent to the signal that would be produced by a target at just less than the maximum range of the radar (i.e. it would be equivalent to a signal that has traversed a path length of $2R_{max}-\Delta$). If $R_{max}$ is, say, 2000 meters the value of $\Delta$ would typically be selected to be about 10 meters (i.e. equivalent to a target located at a range 5 m less than the maximum range) which equates to around 20 range cells.

A hybrid 176 (e.g. a 0°/90° hybrid) divides the output of the second frequency mixer 140 into two signals that have a relative phase difference of 90°. The skilled person would appreciate that the term hybrid means a device that splits a signal into two parts and imparts a relative phase shift between those two parts. These two signals are then added to the I and Q channels carrying the radar return signals using a pair of signal combiners 178a and 178b. The combined signals are then sampled by the ADC 80 and processed by the DSP 88. The range of the artificial target is known, and hence the DSP can monitor the phase corresponding to that range cell and can adjust for phase jumps as described above.

It should be noted that although not essential, the radar preferably comprises both the delay module 152 and the RF delay line discriminator 90. In such a case, the DSP will receive I and Q signals that comprise (i) the radar return signal(s), (ii) a return from an artificial target at a range of $R_{max}-\Delta/2$ and (iii) a signal from RF delay line discriminator 90 that can be used to compensate for any variation in the mean frequency of the STALO.

Figure 12:
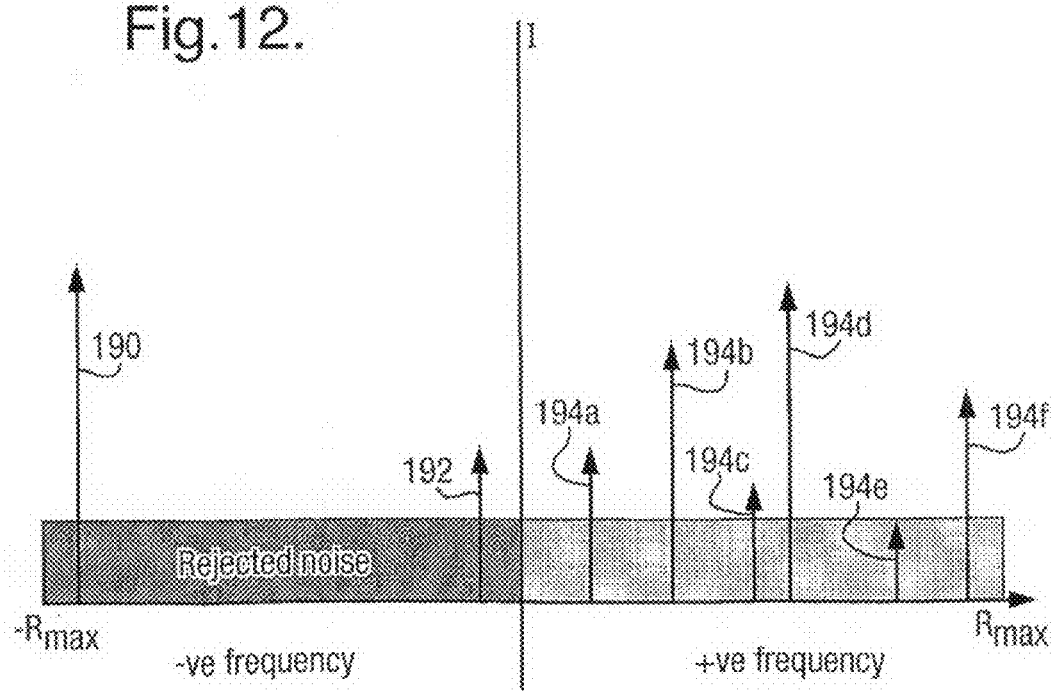
FIG. 12 illustrates how artificial target signal can be separated from real targets to aid processing of the radar data.

Referring to FIG. 12, it is shown how the radar can be adapted to allow the artificial returns (e.g. the return from an artificial target at a range $R_{max}-\Delta/2$ and the signal from RF delay line discriminator 90) to be separated from the return signal(s) that are associated with real targets.

It should be noted that the radar 40 shown in FIG. 4 comprises an IQ quadrature mixer 66 for mixing the RF radar return signals with the RF local oscillator signal. The quadrature mixer arrangement thus outputs an In-phase (I) and a quadrature (Q) signal; i.e. it has separate I and Q channels. The provision of separate I and Q channels allows both the frequency shift and the sign of the frequency shift to be determined. In other words, it is possible to determine the magnitude of the frequency difference between the return and local oscillator signals and also whether the return signal has a higher or lower frequency than the local oscillator signal.

In an FMCW radar, the returns from targets will thus appear in one side of the frequency domain (i.e. at positive or negative frequency) depending on whether an "up-sweep" or "down-sweep" is transmitted. In the radar 40 described with reference to FIG. 4, the use of a saw-tooth waveform (i.e. "up-sweep" only) means that real target will only ever occur in one side of the frequency domain (assuming any Doppler shift in frequency is relatively low). The radar 40 is thus arranged so that the artificial return signals are in the other half of the frequency spectrum compared with the real signals. Therefore, the return from an artificial target does not interfere with real target signals and vice versa.

FIG. 12 thus gives an example of the signal intensity versus frequency spectrum that is output by the DSP 88. The real radar returns 194a-194f (hereinafter collectively referred to as real returns 194) relate to returns from actual targets remote to the radar. Signal 190 is the artificial return from the artificial target close to maximum range (i.e. the artificial signal produced by the delay module 152) and signal 192 is the artificial signal derived from the RF delay line discriminator 90. Arranging the real and artificial signals in this manner ensures that the artificial and real targets do not interfere with each other. Furthermore, such an arrangement also has the advantage of not requiring any additional ADC sampling channels or additional FFT processing.

Separating real and artificial targets by the sign of frequency is advantageous, but it is by no means essential and a number of alternative arrangements would also be possible. For example, the artificial target signal could be passed to an additional ADC channel and a separate FFT operation could then be performed on the output of the additional ADC. This would ensure no interference with the real returns and may be useful when the real return signals are Doppler shifted in frequency by a significant amount.

Although the coherent FMCW radar described above can be used in many applications, it is particularly suited for applications where high resolution radar data is required. Examples of such applications include debris detection on airport runways, perimeter security, cloud radar, automotive collision avoidance, surveying and level measurement. The coherent operation of the system improves, with respect to non-coherent radars, the signal to noise ratio that can be obtained within a defined measurement period.

A radar system of the type described above would be particularly suited to the detection of Foreign Object Debris (FOD) at airports. FOD includes any object found in an inappropriate location that, as a result of being in that location, can damage equipment or injure an airplane or airport personnel. The resulting damage is estimated to cost the aerospace industry $4 billion a year. Since the Air France Concorde tragedy in July 2000, a sequence of events triggered by a 16 inch metal strip on the runway, there has been considerable increased interest in improved techniques for detecting FOD and removing it in a timely manner in all weathers with minimal disruption to airport operations. Currently, manual inspections are carried out typically once every 4 hours by driving along the length of the runway. The effectiveness is limited due to visibility and human error and the technique is ineffective in the dark.

The key to the design of a radar dedicated to FOD detection is in minimising the return from runway clutter whilst maintaining detection against FOD. This is achieved through (i) minimising the azimuthal beamwidth; (ii) using very high range resolution; (iii) siting the radar for optimal grazing angle and (iv) receiving orthogonal polarisations. An FMCW radar of the type described herein, operating at a centre frequency at 94.5 GHz, achieves the necessary range resolution and can also meet all the other criteria.

To implement FOD detection, a radar of the type described above could transmit right hand circularly (RHC) polarised radiation and receive both left hand circularly (LHC) polarised radiation and RHC polarised radiation. The receive diversity improves the detection probability against FOD and also provides capability in rain. The radar would be mounted on a 360° azimuthal turntable and rotated at around 3°/s. Such a rotation rate allows sufficient "hits" per dwell but is fast enough to provide an update after every take-off or landing. The siting of the radar is also important for FOD detection applications and is very dependent upon the airport topography and the runway surface characteristics. Runway surfaces may be sloped or crowned and may be grooved dependent upon the requirement for water run-off. The ideal grazing angle with respect to the runway surface is such that the radar is at the point where it just starts to detect the runway surface.

A coherent radar of the type described above can also be used to measure the Doppler shift associated with any moving objects. This allow object position and speed to be extracted from the radar returns. The coherent radar described above would thus be suited to tracking objects; for example, it could be employed for perimeter security detection and tracking applications.

The invention claimed is:

1. A frequency modulated continuous wave (FMCW) radar device comprising;
    a frequency sweep generator for producing a swept frequency signal,
    a transceiver for generating a signal to be transmitted by the radar to at least one target from the swept frequency signal, said transceiver also being arranged to produce a target difference-frequency signal from the signal transmitted by the radar and the signal returned to the radar from said at least one target;
    a first discriminator for receiving a portion of the swept frequency signal and for producing a reference difference-frequency signal of frequency equal to the difference between the frequency of the swept frequency signal and the frequency of a time displaced swept frequency signal derived from the swept frequency signal;
    an analogue-to-digital converter (ADC) for sampling the target difference-frequency signal to provide a digitized target difference-frequency signal, said ADC being arranged to sample the target difference-frequency signal at a rate derived from the frequency of the reference difference-frequency signal; and
    a processor for determining frequency components of the digitized target difference-frequency signal, wherein the processor is configured to determine any phase difference over a plurality of successive frequency sweeps of said swept frequency signal, for at least one frequency component of the digitized target difference-frequency signal, where said digitised target difference-frequency signal is derived from one of a fixed range target and an artificial target generator, and configured to use the determined phase difference to maintain the phase alignment of other frequency components of the digitised target-difference frequency over said plurality of successive frequency sweeps.

2. A device according to claim 1, wherein said digitized target difference-frequency signal is derived from said fixed range target.

3. A device according to claim 2, wherein said fixed range target is located at a range of less than 100% and more than 90% of the maximum instrumented range of the radar.

4. A device according to claim 1, wherein said digitized target difference-frequency signal is derived from said artificial target signal generator, said artificial target signal generator comprising a second discriminator for producing a fixed range artificial target difference-frequency signal from said swept frequency signal and a time displaced swept frequency signal derived from the swept frequency signal.

5. A device according to claim 4, wherein the artificial target difference-frequency signal is added to the target difference-frequency signal produced by the transceiver prior to sampling by the ADC.

6. A device according to claim 4, wherein said artificial target signal generator produces an artificial target difference-frequency signal equivalent to that produced by a target located at a fixed range of less than 100% and more than 90% of the maximum range of the radar.

7. A device according to claim 4, wherein said first discriminator and said second discriminator share a common delay line.

8. A device according to claim 7, wherein said common delay line is an optical delay line.

9. A device according to claim 1, wherein the processor is arranged such that the step of determining any phase difference over a plurality of successive frequency sweeps of said swept frequency signal comprises the step of monitoring the phase of said at least one frequency component for a jump in phase.

10. A device according to claim 1, comprising a clock pulse generator, the clock pulse generator being arranged to convert the reference difference-frequency signal produced by the first discriminator into a series of timing pulses that are separated by intervals related to the frequency of the reference difference-frequency signal, wherein said timing pulses are used to clock the ADC.

11. A device according to claim 1, wherein the swept frequency signal produced by the frequency sweep generator has a frequency range within a first frequency band and the signal transmitted by the radar has a frequency range within a second frequency band, the frequencies contained in the first frequency band being lower than the frequencies contained in the second frequency band.

12. A device according to claim 11, wherein the transceiver comprises a frequency up-converter for increasing the frequency of the swept frequency signal to the frequency of the signal to be transmitted by the radar wherein said frequency up-converter comprises a stable local oscillator (STALO).

13. A device according to claim 12, comprising a STALO frequency drift monitor, the STALO frequency drift monitor being arranged to produce a drift monitor artificial target difference-frequency signal of frequency equal to the difference between the frequency of the up-converted RF signal transmitted by the radar and the frequency of a time displaced RF signal derived from the RF signal transmitted by the radar.

14. A device according to claim 13, wherein the drift monitor artificial target difference-frequency signal is combined with said target difference-frequency signal prior to being sampled by the ADC.

15. A device according to claim 13, wherein the STALO frequency drift monitor comprises an RF delay line for producing the time displaced RF signal from the RF signal transmitted by the radar.

16. A device according to claim 15, wherein the RF delay line comprises a length of waveguide having a substantially circular cross section.

17. A device according to claim 13, wherein the RF delay line comprises at least one length of waveguide having a substantially rectangular cross section.

18. A device according to claim 13, wherein the RF delay line comprises at least one RF polarization converter.

19. A device according to claim 1, wherein the transceiver comprises an in-phase quadrature (IQ) mixer such that said target difference-frequency signal comprises in-phase (I) and quadrature phase (Q) components.

20. A device according to claim 19, wherein the processor is arranged to determine the frequency components of the digitized target difference-frequency signal using a complex Fast Fourier Transform (FFT).

21. A device according to claim 19, comprising an artificial target signal generator, said artificial target signal generator comprising a second discriminator for producing a fixed range artificial target difference-frequency signal from said swept frequency signal and a time displaced swept frequency signal derived from the swept frequency signal, wherein the artificial target difference-frequency signal produced by the artificial target generator comprises in-phase (I) and quadrature phase (Q) components.

22. A device according to claim 21, wherein the artificial target difference-frequency signal is arranged to have a different sign of frequency to frequency components of the target difference-frequency signal that correspond to real targets.

23. A device according to claim 19, comprising a STALO frequency drift monitor, the STALO frequency drift monitor being arranged to produce a drift monitor artificial target difference-frequency signal of frequency equal to the difference between the frequency of the up-converted RF signal transmitted by the radar and the frequency of a time displaced RF signal derived from the RF signal transmitted by the radar, wherein the drift monitor artificial target difference-frequency signal comprises in-phase (I) and quadrature phase (Q) components.

24. A device according to claim 23, wherein the drift monitor artificial target difference-frequency signal is arranged to have a different sign of frequency to frequency components of the target difference-frequency signal that correspond to real targets.

25. A device according to claim 1, wherein the processor is arranged to provide moving target indication (MTI).

26. A device according to claim 1 that is arranged to transmit a signal having a frequency within at least one of the frequency bands of 70-80 GHz and 90-100 GHz.

27. A device according to claim 1 that is arranged to transmit a signal having a frequency greater than 20 GHz.

28. A frequency modulated continuous wave (FMCW) radar device comprising;
 a frequency sweep generator for producing a swept frequency signal,
 a transceiver for generating a signal to be transmitted by the radar to at least one target from the swept frequency signal, said transceiver also being arranged to produce a target difference-frequency signal from the signal transmitted by the radar and the signal returned to the radar from said at least one target;
 a first discriminator for receiving a portion of the swept frequency signal and for producing a reference difference-frequency signal of frequency equal to the difference between the frequency of the swept frequency signal and the frequency of a time displaced swept frequency signal derived from the swept frequency signal;
 an analogue-to-digital converter (ADC) for sampling the target difference-frequency signal to provide a digitized target difference-frequency signal, said ADC being arranged to sample the target difference-frequency signal at a rate derived from the frequency of the reference difference-frequency signal; and
 a processor for determining frequency components of the digitized target difference-frequency signal, wherein, the processor is configured to determine, for at least one frequency component of the digitized target difference-frequency signal, any phase difference between frequency sweeps of said swept frequency signal,
 wherein said at least one frequency component of the digitized target difference-frequency signal corresponds to the return signal from at least one fixed range target, wherein the processor is arranged to perform the steps of (a) measuring the phase of at least one frequency component of the digitized target difference-frequency signal corresponding to the return from at least one fixed range target over a plurality of successive frequency sweeps and (b) using the phase measurements of step (a) to maintain the phase alignment of other frequency components of the digitized target difference-frequency signal over said plurality of successive frequency sweeps, wherein the processor is arranged to coherently integrate the phase aligned frequency components of the digitized target difference-frequency signal over a plurality of successive frequency sweeps.

29. A frequency modulated continuous wave (FMCW) radar device comprising;
 a frequency sweep generator for producing a swept frequency signal,
 a transceiver for generating a signal to be transmitted by the radar to at least one target from the swept frequency signal, said transceiver also being arranged to produce a target difference-frequency signal from the signal transmitted by the radar and the signal returned to the radar from said at least one target;
 a first discriminator for receiving a portion of the swept frequency signal and for producing a reference difference-frequency signal of frequency equal to the difference between the frequency of the swept frequency signal and the frequency of a time displaced swept frequency signal derived from the swept frequency signal;
 an analogue-to-digital converter (ADC) for sampling the target difference-frequency signal to provide a digitized target difference-frequency signal, said ADC being arranged to sample the target difference-frequency signal at a rate derived from the frequency of the reference difference-frequency signal; and
 a processor for determining frequency components of the digitized target difference-frequency signal, wherein the processor is configured to determine for at least one frequency component of the digitized target difference-frequency signal any phase difference between frequency sweeps of said swept frequency signal, wherein the transceiver comprises an in-phase quadrature (IQ) mixer such that said target difference-frequency signal comprises in-phase (I) and quadrature phase (Q) components, wherein the ADC comprises at least first and second ADC elements, the first ADC element being arranged to sample the in-phase (I) component of the target difference-frequency signal and the second ADC element being arranged to sample the quadrature phase (Q) component of the target difference-frequency signal.

30. A method of radar operation comprising the steps of;
(i) generating a swept frequency signal;
(ii) producing a reference difference-frequency signal of frequency equal to the difference between the frequency of the swept frequency signal and the frequency of a time displaced swept frequency signal derived from the swept frequency signal;
(iii) generating a signal to be transmitted to at least one target by the radar from the swept frequency signal,
(iv) producing a target difference-frequency signal from the signal transmitted by the radar and the signal returned to the radar from said at least one target;
(v) using an analogue-to-digital converter (ADC) to sample the target difference-frequency signal to provide a digitized target difference-frequency signal, the sampling rate of the ADC being derived from the frequency of the reference difference-frequency signal,
(vi) determining one or more frequency components of the digitized target difference-frequency signal, and
(vii) determining, for at least one frequency component of the digitized target difference-frequency signal, where said digitized target difference-frequency signal is derived from one of a fixed range target and an artificial target generator, any phase difference over a plurality of successive frequency sweeps of said swept frequency signal, and to use the determined phase difference to maintain the phase alignment of other frequency components of the digitised target-difference frequency over said plurality of successive frequency sweeps.

31. A method according to claim 30, wherein said at least one frequency component of the digitized target difference-frequency signal corresponds to the return signal from at least one fixed range target.

32. A method according to claim 30, comprising the additional step of generating a fixed range artificial target difference-frequency signal from said swept frequency signal and a time displaced swept frequency signal derived from the swept frequency signal.

33. A method according to claim 30, comprising the steps of (a) measuring the phase of at least one frequency component of the digitized target difference-frequency signal corresponding to the return from at least one fixed range target over a plurality of successive frequency sweeps and (b) using the phase measurements of step (a) to maintain the phase alignment of other frequency components of the digitized target difference-frequency signal over said plurality of successive frequency sweeps.

34. A method according to claim 33, wherein the step (a) comprises the step of monitoring the phase of said at least one frequency component for a jump in phase.

35. A method according to claim 30, wherein the step of (iii) generating a signal to be transmitted by the radar from the swept frequency signal comprises the step of increasing the frequency of the swept frequency signal to a radio frequency (RF) signal for transmission by the radar.

36. A method according to claim 35, further comprising the step of producing a drift monitor artificial target difference-frequency signal having a frequency equal to the difference between the frequency of the up-converted RF signal transmitted by the radar and the frequency of a time displaced RF signal derived from the RF signal transmitted by the radar.

37. A method according to claim 30, wherein the step of (iv) producing a target difference-frequency signal comprises the step of producing a target difference-frequency signal having in-phase (I) and quadrature phase (Q) components.

38. A method according to claim 30, wherein the step of (vi) determining the frequency components of the digitized target difference-frequency signal comprises the step of using a complex Fast Fourier Transform (FFT).

39. A method of radar operation, comprising the steps of:
(i) generating a swept frequency signal;
(ii) producing a reference difference-frequency signal of frequency equal to the difference between the frequency of the swept frequency signal and the frequency of a time displaced swept frequency signal derived from the swept frequency signal;
(iii) generating a signal to be transmitted by the radar from the swept frequency signal,
(iv) producing a target difference-frequency signal from the signal transmitted by the radar and the signal returned to the radar from a remote target;
(v) using an analogue-to-digital converter (ADC) to sample the target difference-frequency signal to provide a digitized target difference-frequency signal, the sampling rate of the ADC being derived from the frequency of the reference difference-frequency signal, and
(vi) determining one or more frequency components of the digitized target difference-frequency signal,
(vii) determining for at least one frequency component of the digitized target difference-frequency signal any phase difference between frequency sweeps of said swept frequency signal;
(viii) measuring the phase of at least one frequency component of the digitized target difference-frequency signal corresponding to the return from a fixed range target over a plurality of successive frequency sweeps;
(ix) using the phase measurements of step (viii) to maintain the phase alignment of other frequency components of the digitized target difference-frequency signal over said plurality of successive frequency sweeps, wherein step (viii) comprises the step of monitoring the phase of said at least one frequency component for a jump in phase; and
(x) coherently integrating the phase aligned frequency components of the digitized target difference-frequency signal over a plurality of successive frequency sweeps.

* * * * *